United States Patent
Lee et al.

(10) Patent No.: US 7,956,928 B2
(45) Date of Patent: Jun. 7, 2011

(54) APPARATUS AND METHOD FOR VIDEO DE-INTERLACE

(75) Inventors: Tung-Hsin Lee, Taipei County (TW); Yen-Lung Lu, Taipei (TW); Wei-Jen Lo, Hsinchu (TW)

(73) Assignee: Novatek Microelectronics Corp., Hsinchu (TW)

( * ) Notice: Subject to any disclaimer, the term of this patent is extended or adjusted under 35 U.S.C. 154(b) by 1216 days.

(21) Appl. No.: 11/567,741

(22) Filed: Dec. 7, 2006

(65) Prior Publication Data

US 2008/0068497 A1 Mar. 20, 2008

(30) Foreign Application Priority Data

Sep. 14, 2006 (TW) .............................. 95133974 A

(51) Int. Cl.
*H04N 7/01* (2006.01)
*H04N 11/20* (2006.01)
(52) U.S. Cl. ...................................... 348/452; 348/448
(58) Field of Classification Search .......... 348/441–458, 348/701, 702, 700
See application file for complete search history.

(56) References Cited

U.S. PATENT DOCUMENTS

| | | | |
|---|---|---|---|
| 5,398,071 A | 3/1995 | Gove et al. | |
| 5,565,998 A | 10/1996 | Coombs et al. | |
| 6,014,182 A | 1/2000 | Swartz | |
| 6,157,412 A | 12/2000 | Westerman et al. | |
| 6,201,577 B1 | 3/2001 | Swartz | |
| 6,580,463 B2 | 6/2003 | Swartz | |
| 6,589,237 B2 | 7/2003 | Woloszko et al. | |
| 6,700,622 B2 * | 3/2004 | Adams et al. | 348/448 |
| 6,784,921 B2 | 8/2004 | Lim | |
| 6,891,571 B2 | 5/2005 | Shin et al. | |
| 7,705,913 B2 * | 4/2010 | Jia et al. | 348/448 |
| 2005/0206790 A1 * | 9/2005 | Chao | 348/700 |

OTHER PUBLICATIONS

"Office Action of Taiwan counterpart application", issued on Aug. 31, 2009, pp. 1-8.

* cited by examiner

*Primary Examiner* — M. Lee
(74) *Attorney, Agent, or Firm* — Jianq Chyun IP Office

(57) ABSTRACT

A video de-interlace apparatus and a method thereof are disclosed. The apparatus includes a combing detection apparatus and a de-interlace format determining apparatus. The combing detection apparatus receives a plurality of successive fields, performs combing detection to the fields, and outputs a combing detection result. The de-interlace format determining apparatus receives the combing detection result and compares the combing detection result with a plurality of models. When the combing detection result is conform to a specific model among the models, the de-interlace format determining apparatus determines a specific de-interlace format corresponding to the specific model to de-interlace the foregoing fields.

21 Claims, 11 Drawing Sheets

APPARATUS AND METHOD FOR VIDEO DE-INTERLACE

CROSS-REFERENCE TO RELATED APPLICATION

This application claims the priority benefit of Taiwan application serial no. 95133974, filed Sep. 14, 2006. All disclosure of the Taiwan application is incorporated herein by reference.

BACKGROUND OF THE INVENTION

1. Field of the Invention

The present invention relates to a video de-interlace apparatus and a method thereof. More particularly, the present invention relates to a video de-interlace apparatus based on film originated combing and a method thereof.

2. Description of Related Art

The speed of 24 fields per second (i.e. 3:2 film format) or 30 fields per second (i.e. 2:2 film format) is generally used for shooting a film. However, the video standard of TV is 50 fields per second or 60 fields per second, so when a film is played on TV, a frame has to be dismantled alternatively into two fields and a plurality of fields have to be additionally inserted to maintain the playing speed of the film. Such an operation is referred to as telecine, and the most popular telecine formats include 2:2 pull-down and 3:2 pull-down.

With NTSC video as example, which requires 60 fields per second, when the video is in 3:2 film format, which has only 24 frames per second, there are only 48 fields per second if these frames are directly divided into odd fields and even fields, as shown in FIG. 1A, a frame 11 has to be divided into an odd field O111 and an even field E111, and another frame 12 has to be divided into an odd field O121, an even field E122, and an odd field O123, and so on, to obtain 60 fields. The foregoing operation is referred to as 3:2 pull-down. FIG. 1B illustrates the conventional 2:2 pull-down. Since original 2:2 film format has 30 frames per second, so all the frames F01 are simply divided into odd fields O01 and even fields E01.

When a TV receives the video, it plays the fields one after another alternatively, thus, the fields have to be de-interlaced before being played so as to prevent combing problem caused by two different fields appearing in one image. FIG. 2 illustrates the combing caused when two different fields appear in one image. There are many ways for de-interlacing a video, generally speaking, if the video source is in film format, the best de-interlace method is to combine the two fields of a frame back into a frame to obtain the clearest image, and such an operation is referred to as weave, and the most popular weaving methods include inverse 2:2 pull-down and inverse 3:2 pull-down. FIGS. 3A and 3B respectively illustrate inverse 2:2 pull-down and inverse 3:2 pull-down.

Since a video may be originated from 2:2 pull-down, 3:2 pull-down, or a general video, the video has to be analyzed and determined before inverse telecine is performed to the video, so that whether a particular field should be weaved with a previous field or a next field, or a general de-interlace operation should be performed can be determined.

SUMMARY OF THE INVENTION

Accordingly, the present invention is directed to a video de-interlace apparatus for determining the format of a video and selecting a suitable de-interlace format.

According to another aspect of the present invention, a video de-interlace method is provided for detecting the combing number of a plurality of successive fields and performing film detection according to the detected combing number, so as to de-interlace the successive fields appropriately.

The present invention provides a video de-interlace apparatus which includes a combing detection apparatus and a de-interlace format determining apparatus. The combing detection apparatus receives a plurality of successive fields, performs combing detection to the fields, and outputs a combing detection result. The de-interlace format determining apparatus receives the combing detection result and compares the combing detection result with a plurality of models. When the combing detection result conforms to one specific model of the models, the de-interlace format determining apparatus determines a specific de-interlace format corresponding to the specific model to de-interlace the fields.

According to a video de-interlace apparatus in an exemplary embodiment of the present invention, the successive fields include odd fields and even fields, and the combing detection apparatus includes a motion detection apparatus and a combing detector. The motion detection apparatus receives the successive fields and determines whether there is motion between adjacent odd and even fields among the successive fields. When the motion detection apparatus determines that there is motion between a specific odd field and a specific even field neighboring with the specific odd field among the successive fields, the combing detector counts the number of combings of the specific odd and even fields.

According to a video de-interlace apparatus in an exemplary embodiment of the present invention, each of the fields includes a plurality of pixels respectively denoted as P(x, y), wherein (x, y) represents the position of the pixel in the field. The motion detection apparatus includes a motion calculation apparatus and a motion determination apparatus. The motion calculation apparatus receives pixel P(x, y) of the $i^{th}$ field, pixel P(x, y+1) of the $i^{th}$ field, pixel P(x, y) of the $(i+1)^{th}$ field, pixel P(x, y+1) of the $(i+1)^{th}$ field, pixel P(x, y) of the $(i+2)^{th}$ field, and pixel P(x, y+1) of the $(i+2)^{th}$ field. The motion calculation apparatus adds the difference between pixel P(x, y) of the $(i+2)^{th}$ field and pixel P(x, y) of the $(i+1)^{th}$ field to the difference between pixel P(x, y+1) of the $(i+2)^{th}$ field the pixel P(x, y) of the $(i+1)^{th}$ field as a first sum, adds the difference between pixel P(x, y+1) of the $(i+2)^{th}$ field and pixel P(x, y+1) of the $(i+1)^{th}$ field to the difference between pixel P(x, y+1) of the $(i+2)^{th}$ field and pixel P(x, y) of the $(i+1)^{th}$ field as a second sum, and adds the difference between pixel P(x, y) of the $(i+2)^{th}$ field and pixel P(x, y) of the $i^{th}$ field to the difference between pixel P(x, y+1) of the $(i+2)^{th}$ field and pixel P(x, y+1) of the $i^{th}$ field as a third sum, wherein i is a natural number and 0<=i<=the number of the fields. The motion determination apparatus receives the first, the second, and the third sum and outputs an even pixel movement signal and an odd pixel movement signal. When the first sum and the third sum are greater than or equal to a first predetermined value, the motion determination apparatus enables the even pixel movement signal, and when the second sum and the third sum are greater than or equal to the first predetermined value, the motion determination apparatus enables the odd pixel movement signal.

According to a video de-interlace apparatus in an exemplary embodiment of the present invention, the motion calculation apparatus includes the first to the fifth subtractor and the first to the third adder. The first subtractor performs subtraction to pixel P(x, y) of the $(i+2)^{th}$ field and pixel P(x, y) of the $(i+1)^{th}$ field and outputs a first difference. The second subtractor performs subtraction to pixel P(x, y+1) of the $(i+2)^{th}$ field and pixel P(x, y) of the $(i+1)^{th}$ field and outputs a second difference. The third subtractor performs subtraction to pixel P(x, y+1) of the $(i+2)^{th}$ field and pixel P(x, y+1) of the $(i+1)^{th}$ field and outputs a third difference. The fourth subtractor performs subtraction to pixel P(x, y) of the $(i+2)^{th}$ field and the pixel P(x, y) of the $i^{th}$ field and outputs a fourth difference. The fifth subtractor performs subtraction to pixel P(x, y+1) of the $(i+2)^{th}$ field and pixel P(x, y+1) of the $i^{th}$ field and outputs a fifth difference. The first adder receives the first and the second difference and adds the first difference to the second difference to output the first sum. The second adder receives the second and the third difference and adds the second difference to the third difference to output the second sum. The third adder receives the fourth and the fifth difference and adds the fourth difference to the fifth difference to output the third sum. In an exemplary embodiment of the present invention, the third, fourth, and fifth adders further perform low pass calculations.

According to a video de-interlace apparatus in an exemplary embodiment of the present invention, the motion determination apparatus includes the first to the third comparator and the first to the second logic circuit. The first comparator receives the first sum and the first predetermined value and outputs a first determination signal. When the first sum is greater than or equal to the first predetermined value, the first comparator enables the first determination signal. The second comparator receives the second sum and the first predetermined value and outputs a second determination signal. When the second sum is greater than or equal to the first predetermined value, the second comparator enables the second determination signal. The third comparator receives the third sum and the first predetermined value and outputs a third determination signal. When the third sum is greater than or equal to the first predetermined value, the third comparator enables the third determination signal. The first logic circuit is coupled to the first and the third comparator for receiving the first and the third determination signal and outputting the even pixel movement signal. When the first and the third determination signal are both enabled, the first logic circuit enables the even pixel movement signal. The second logic circuit is coupled to the second and the third comparator for receiving the second and the third determination signal and outputting the odd pixel movement signal. When the second and the third determination signal are both enabled, the second logic circuit enables the odd pixel movement signal.

According to an exemplary embodiment of the present invention, the combing detector includes a combing calculation apparatus, a combing determination apparatus, and a combing accumulation record buffer. The combing determination apparatus receives pixel P(x, y) of the $(i+1)^{th}$ field, pixel P(x, y+1) of the $(i+1)^{th}$ field, pixel P(x, y) of the $(i+2)^{th}$ field, and pixel P(x, y+1) of the $(i+2)^{th}$ field. When the difference between pixel P(x, y) of the $(i+2)^{th}$ field and pixel P(x, y) of the $(i+1)^{th}$ field is greater than or equal to a second predetermined value, the combing determination apparatus outputs and enables a first comparison signal. When the difference between pixel P(x, y+1) of the $(i+2)^{th}$ field and pixel P(x, y) of the $(i+1)^{th}$ field is greater than or equal to the second predetermined value, the combing determination apparatus outputs and enables a second comparison signal. When the difference between pixel P(x, y+1) of the $(i+2)^{th}$ field and pixel P(x, y+1) of the $(i+1)^{th}$ field is greater than or equal to the second predetermined value, the combing determination apparatus outputs and enables a third comparison signal. Wherein i is a natural number and 0<=i<=the number of the fields. The combing calculation apparatus receives the first comparison signal, the second comparison signal, the third comparison signal, the odd pixel movement signal, and the even pixel movement signal and determines whether there is combing in pixel P(x, y) of the $(i+1)^{th}$ field, pixel P(x, y+1) of the $(i+1)^{th}$ field, pixel P(x, y) of the $(i+2)^{th}$ field, and pixel P(x, y+1) of the $(i+2)^{th}$ field according to the received signals. If there is combing, the combing calculation apparatus adds a predetermined value to a combing accumulation as the combing accumulation, and outputs the combing accumulation after all the pixels in the $(i+1)^{th}$ frame and the $(i+2)^{th}$ frame have been processed. The combing accumulation record buffer receives the combing accumulation for storing the combing accumulation corresponding to every K successive fields.

According to an exemplary embodiment of the present invention, the combing calculation apparatus includes the sixth to the eighth subtractor and the fourth to the sixth comparator. The sixth subtractor performs subtraction to pixel P(x, y) of the $(i+2)^{th}$ field and pixel P(x, y) of the $(i+1)^{th}$ field and outputs a sixth difference. The seventh subtractor performs subtraction to pixel P(x, y+1) of the $(i+2)^{th}$ field and pixel P(x, y) of the $(i+1)^{th}$ field and outputs a seventh difference. The eighth subtractor performs subtraction to pixel P(x, y+1) of the $(i+2)^{th}$ field and pixel P(x, y+1) of the $(i+1)^{th}$ field and outputs an eighth difference. The fourth comparator compares the sixth difference and the second predetermined value and outputs the first comparison signal, and when the sixth difference is greater than or equal to the second predetermined value, the fourth comparator enables the first comparison signal. The fifth comparator compares the seventh difference and the second predetermined value and outputs the second comparison signal, and when the seventh difference is greater than or equal to the second predetermined value, the fifth comparator enables the second comparison signal. The sixth comparator compares the eighth difference and the second predetermined value and outputs the third comparison signal, and when the eighth difference is greater than or equal to the second predetermined value, the sixth comparator enables the third comparison signal.

According to a video de-interlace apparatus in an exemplary embodiment of the present invention, the combing determination apparatus further includes a combing checking apparatus. The combing checking apparatus receives the sixth, the seventh, and the eighth difference, compares the difference between pixel P(x−1, y) of the $(i+2)^{th}$ field and pixel P(x−1, y) of the $(i+1)^{th}$ field with the sixth difference, compares the difference between pixel P(x−1, y+1) of the $(i+2)^{th}$ field and pixel P(x−1, y) of the $(i+1)^{th}$ field with the seventh difference, compares the difference between pixel P(x−1, y+1) of the $(i+2)^{th}$ field and pixel P(x−1, y+1) of the $(i+1)^{th}$ field with the eighth difference, and outputs a first combing determination signal and a second combing determination signal. Wherein the combing calculation apparatus is further coupled to the combing checking apparatus for receiving the first comparison signal, the second comparison signal, the third comparison signal, the odd pixel movement signal, the even pixel movement signal, the first combing determination signal, and the second combing determination signal and determining whether there is combing in pixel P(x, y) of the $(i+1)^{th}$ field, pixel P(x, y+1) of the $(i+1)^{th}$ field, pixel P(x, y) of the $(i+2)^{th}$ field, and pixel P(x, y+1) of the $(i+2)^{th}$ field according to the received signals.

According to a video de-interlace apparatus in an exemplary embodiment of the present invention, the combing checking apparatus further includes a first combing type checker, a second combing type checker, a first combing type register, a second combing type register, a first combing type comparator, and a second combing type comparator. The first combing type checker receives the sixth and the seventh difference for determining the combing type of pixel P(x, y) and pixel P(x, y+1) of the $(i+2)^{th}$ field and pixel P(x, y) of the $(i+1)^{th}$ field. The second combing type checker receives the seventh and the eighth difference for determining the combing type of pixel P(x, y) and pixel P(x, y+1) of the $(i+1)^{th}$ field and pixel P(x, y+1) of the $(i+2)^{th}$ field. The first combing type register stores the combing type of pixel P(x−1, y) and pixel P(x−1, y+1) of the $(i+2)^{th}$ field and pixel P(x−1, y) of the $(i+1)^{th}$ field. The second combing type register stores the combing type of pixel P(x−1, y) and pixel P(x−1, y+1) of the $(i+1)^{th}$ field and pixel P(x−1, y+1) of the $(i+2)^{th}$ field. The first combing type comparator is coupled to the first combing type checker and the first combing type register for comparing the combing type of pixel P(x, y) and pixel P(x, y+1) of the $(i+2)^{th}$ field and pixel P(x, y) of the $(i+1)^{th}$ field with the combing type of pixel P(x−1, y) and pixel P(x−1, y+1) of the $(i+2)^{th}$ field and pixel P(x−1, y) of the $(i+1)^{th}$ field. When the two combing types are the same, the first combing type comparator outputs and enables the first combing determination signal. The second combing type comparator is coupled to the second combing type checker and the second combing type register for comparing the combing type of pixel P(x, y) and pixel P(x, y+1) of the $(i+1)^{th}$ field and pixel P(x, y+1) of the $(i+2)^{th}$ field with the combing type of pixel P(x−1, y) and pixel P(x−1, y+1) of the $(i+1)^{th}$ field and pixel P(x−1, y+1) of the $(i+2)^{th}$ field. When the two combing types are the same, the second combing type comparator outputs and enables the second combing determination signal.

According to an exemplary embodiment of the present invention, the combing calculation apparatus includes the first to the fourth logic gate, an accumulator, and a delay circuit. The first logic gate receives the odd pixel movement signal, the first comparison signal, and the second comparison signal and outputs a first logic signal. When the odd pixel movement signal, the first comparison signal, and the second comparison signal are enabled, the first logic signal is in a first logic state. The second logic gate receives the even pixel movement signal, the second comparison signal, and the third comparison signal and outputs a second logic signal. When the even pixel movement signal, the second comparison signal, and the third comparison signal are enabled, the second logic signal is in the first logic state. The delay circuit is coupled to the second logic gate for receiving the second logic signal and outputting a second delayed logic signal after delaying the second logic signal for a predetermined time. The third logic gate is coupled to the first logic gate and the delay circuit for receiving the first logic signal and the second delayed logic signal and outputting a third logic signal. When the first logic signal and the second delayed logic signal are both in the first logic state, the third logic gate sets the third logic signal to the first logic state. The fourth logic gate is coupled to the first logic gate and the second logic gate for receiving the first and the second logic signal and outputting a fourth logic signal. When both the first and the second logic signal are in the first logic state, the fourth logic gate sets the fourth logic signal to the first logic state. The accumulator is coupled to the third and the fourth logic gate for receiving the third logic signal and the fourth logic signal. When one of the third and the fourth logic signal is in the first logic state, the accumulator adds the predetermined value to the combing accumulation as the combing accumulation, and when both the third and the fourth logic signal are in the first logic state, the accumulator adds two times of the predetermined value to the combing accumulation as the combing accumulation.

According to an exemplary embodiment of the present invention, the combing calculation apparatus includes a first logic gate, a second logic gate, a delay circuit, a third logic gate, a fourth logic gate, and a combing cluster recorder. The first logic gate receives the odd pixel movement signal, the first comparison signal, and the second comparison signal and outputs a first logic signal. When the odd pixel movement signal, the first comparison signal, and the second comparison signal are enabled, the first logic signal is in a first logic state. The second logic gate receives the even pixel movement signal, the second comparison signal, and the third comparison signal and outputs a second logic signal. When the even pixel movement signal, the second comparison signal, and the third comparison signal are enabled, the second logic signal is in the first logic state. The delay circuit is coupled to the second logic gate for receiving the second logic signal and outputting a second delayed logic signal after delaying the second logic signal for a predetermined time. The third logic gate is coupled to the first logic gate and the delay circuit for receiving the first logic signal and the second delayed logic signal and outputting a third logic signal. When the first logic signal and the second delayed logic signal are both in the first logic state, the third logic gate sets the third logic signal to the first logic state. The fourth logic gate is coupled to the first and the second logic gate for receiving the first logic signal and the second logic signal and outputting a fourth logic signal. When both the first and the second logic signal are in the first logic state, the fourth logic gate sets the fourth logic signal to the first logic state. The combing cluster recorder is coupled to the third and the fourth logic gate for receiving and recording the third and the fourth logic signal and counting the number of the third and the fourth logic signal being in the first logic state within pixels P(x, y)~P(x−k, y−k). When the counted number is greater than a cluster predetermined value, the combing cluster recorder adds the foregoing number to the combing accumulation as the combing accumulation, and the combing cluster recorder outputs the combing accumulation after all the pixels in the $(i+1)^{th}$ frame and the $(i+2)^{th}$ frame have been processed, wherein k is a natural number and k<=x, k<=y.

According to an exemplary embodiment of the present invention, the combing detection result includes m combing accumulations, and the $i^{th}$ combing accumulation corresponds to the combing number of the $i^{th}$ field and the $(i+1)^{th}$ field, wherein m and i are natural numbers and m>i. The de-interlace format determining apparatus includes a film model detector which receives m combing accumulations and compares the m combing accumulations with a plurality of built-in film models. When the m combing accumulations are conform to a specific model among the film models, the de-interlace format determining apparatus determines a specific de-interlace format corresponding to the specific model to de-interlace the fields.

According to an exemplary embodiment of the present invention, the film model detector includes a 2:2 film model comparator, a 3:2 film model comparator, and a de-interlace format decision maker. The 2:2 film model comparator includes a plurality of 2:2 film model comparators and a 2:2 film status detector. Each 2:2 film model comparator includes one of a plurality of 2:2 film models, and the 2:2 film model comparator receives the m combing accumulations and outputs "match", "mismatch", or "unsure" signal according to whether the m combing accumulations are conform to the 2:2 film model in the 2:2 film model comparator. The 2:2 film status detector is coupled to the 2:2 film model comparators and when the number of "match" signals output by a specific 2:2 film model comparator is greater than a third predetermined value, the 2:2 film status detector outputs a specific 2:2 match signal and a specific 2:2 countermeasure signal corresponding to the 2:2 film model in the specific 2:2 film model comparator according to the "match", "mismatch", and "unsure" signal output by each of the 2:2 film model comparator. In addition, the 3:2 film model comparator includes a plurality of 3:2 film model comparators and a 3:2 film status detector. Each 3:2 film model comparator includes one of a plurality of 3:2 film models, and the 3:2 film model comparator receives the m combing accumulations and outputs "match", "mismatch", and "unsure" signal according to whether the m combing accumulations are conform to the 3:2 film model in the 3:2 film model comparator. The 3:2 film status detector is coupled to the 3:2 film model comparators, and when the number of "match" signals output by a specific 3:2 film model comparator is greater than a third predetermined value, the 3:2 film status detector outputs a specific 3:2 match signal and a specific 3:2 countermeasure signal corresponding to the 3:2 film model in the specific 3:2 film model comparator according to the "match", "mismatch", and "unsure" signal" output by each 3:2 film model comparator. The de-interlace format decision maker receives the specific 2:2 match signal, the specific 2:2 countermeasure signal, the specific 3:2 match signal, and the specific 3:2 countermeasure signal and determines a specific de-interlace format according to the received signals for de-interlacing the successive fields.

According to an exemplary embodiment of the present invention, the de-interlace format decision maker includes a format decision maker and a decision selector. The format decision maker is coupled to the 2:2 film status detector and the 3:2 film status detector for receiving the specific 2:2 match signal and the specific 3:2 match signal and outputting a format decision signal. The decision selector is coupled to the 2:2 film status detector and the 3:2 film status detector for receiving the specific 2:2 countermeasure signal, the specific 3:2 countermeasure signal, and the format decision signal and selecting a specific de-interlace format from a plurality of de-interlace formats for de-interlacing the fields according to the received signals.

According to an exemplary embodiment of the present invention, the de-interlace format decision maker further includes a film scene change detector coupled to the format decision maker. The film scene change detector receives the format decision signal, and determines whether there is scene change according to the format decision signal and the format decision signal received previously. When the film scene change detector determines that there is scene change, the film scene change detector outputs and enables a film scene change signal. Wherein when the film scene change signal is enabled, the film model detector and the decision selector are reset and which receive another m combing accumulations to determine the de-interlace format for de-interlacing the successive fields.

According to an exemplary embodiment of the present invention, the de-interlace format determining apparatus further includes a scene change detector which receives m combing accumulations and determines whether there is scene change according to the m combing accumulations. When the scene change detector determines that there is scene change, the scene change detector outputs and enables a scene change signal. Wherein when the scene change signal is enabled, the film model detector is reset and which receives another m combing accumulations to determine the de-interlace format for de-interlacing the successive fields.

The present invention provides a video de-interlace method. The method includes following steps. A plurality of successive fields is provided. Combing detection is performed to the fields to obtain a combing detection result. The combing detection result is compared with a plurality of models respectively. When the combing detection result conforms to a specific model among the models, a specific de-interlace format corresponding to the specific model is determined for de-interlacing the fields.

According to an exemplary embodiment of the present invention, the successive fields include odd fields and even fields, and the step of "performing combing detection to the fields to obtain a combing detection result" includes: a. determining whether there being motion between adjacent odd and even fields in the successive fields; b. when a motion detection apparatus determines that there is motion between a specific odd field and an adjacent even field among the successive fields, the motion detection apparatus counts a combing number of the specific odd and even fields, and the foregoing operation is performed m times to obtain m combing numbers, wherein m is a natural number.

According to an exemplary embodiment of the present invention, each of the fields includes a plurality of pixels respectively denoted as $P(x, y)$, wherein $(x, y)$ represents the position of the pixel in the field, and the foregoing step a includes: receiving pixel $P(x, y)$ of the $i^{th}$ field, pixel $P(x, y+1)$ of the $i^{th}$ field, pixel $P(x, y)$ of the $(i+1)^{th}$ field, pixel $P(x, y+1)$ of the $(i+1)^{th}$ field, pixel $P(x, y)$ of the $(i+2)^{th}$ field, and pixel $P(x, y+1)$ of the $(i+2)^{th}$ field; adding the difference between pixel $P(x, y)$ of the $(i+2)^{th}$ field and pixel $P(x, y)$ of the $(i+1)^{th}$ field to the difference between pixel $P(x, y+1)$ of the $(i+2)^{th}$ field and pixel $P(x, y)$ of the $(i+1)^{th}$ field as a first sum; adding the difference between pixel $P(x, y+1)$ of the $(i+2)^{th}$ field and pixel $P(x, y+1)$ of the $(i+1)^{th}$ field to the difference between pixel $P(x, y+1)$ of the $(i+2)^{th}$ field and pixel $P(x, y)$ of the $(i+1)^{th}$ field as a second sum; adding the difference between pixel $P(x, y)$ of the $(i+2)^{th}$ field and pixel $P(x, y)$ of the $i^{th}$ field to the difference between pixel $P(x, y+1)$ of the $(i+2)^{th}$ field and pixel $P(x, y+1)$ of the $i^{th}$ field as a third sum, wherein i is a natural number and $0<=i<=$the number of the fields; and determining an even pixel movement when the first sum and the third sum being greater than or equal to a first predetermined value, and determining an odd pixel movement when the second sum and the third sum being greater than or equal to the first predetermined value.

According to an exemplary embodiment of the present invention, the foregoing step b includes: when "the difference between pixel $P(x, y)$ of the $(i+2)^{th}$ field and pixel $P(x, y)$ of the $(i+1)^{th}$ field being greater than or equal to a second predetermined value" and "the difference between pixel $P(x, y+1)$ of the $(i+2)^{th}$ field and pixel $P(x, y)$ of the $(i+1)^{th}$ field being greater than or equal to the second predetermined value" and "the odd pixel movement", a predetermined value is added to the combing accumulation as the combing accumulation; when "the difference between pixel $P(x, y+1)$ of the $(i+2)^{th}$ field and pixel $P(x, y)$ of the $(i+1)^{th}$ field being greater than or equal to the second predetermined value" and "the difference between pixel $P(x, y+1)$ of the $(i+2)^{th}$ field and pixel $P(x, y+1)$ of the $(i+1)^{th}$ field being greater than or equal to the second predetermined value" and "the even pixel movement", the predetermined value is added to the combing accumulation as the combing accumulation; and the combing accumulation serves as the combing number after all the pixels in the $(i+1)^{th}$ frame and the $(i+2)^{th}$ frame having been processed.

According to an exemplary embodiment of the present invention, the foregoing "when 'the difference between pixel $P(x, y)$ of the $(i+2)^{th}$ field and pixel $P(x, y)$ of the $(i+1)^{th}$ field being greater than or equal to a second predetermined value' and 'the difference between pixel $P(x, y+1)$ of the $(i+2)^{th}$ field and pixel $P(x, y)$ of the $(i+1)^{th}$ field being greater than or equal to the second predetermined value' and 'the odd pixel movement'" further includes following condition: when the combing type of pixel P(x, y), pixel P(x, y+1) of the $(i+2)^{th}$ field and pixel P(x, y) of the $(i+1)^{th}$ field being the same as the combing type of pixel P(x-1, y), pixel P(x-1, y+1) of the $(i+2)^{th}$ field and pixel P(x-1, y) of the $(i+1)^{th}$ field, the predetermined value is added to the combing accumulation as the combing accumulation.

According to an exemplary embodiment of the present invention, the foregoing "when 'the difference between pixel P(x, y+1) of the $(i+2)^{th}$ field and pixel P(x, y) of the $(i+1)^{th}$ field being greater than or equal to the second predetermined value' and 'the difference between pixel P(x, y+1) of the $(i+2)^{th}$ field and pixel P(x, y+1) of the $(i+1)^{th}$ field being greater than or equal to the second predetermined value' and 'the even pixel movement'" further includes following condition: when the combing type of pixel P(x, y), pixel P(x, y+1) of the $(i+1)^{th}$ field and pixel P(x, y+1) of the $(i+1)^{th}$ field being the same as the combing type of pixel P(x-1, y), pixel P(x-1, y+1) of the $(i+2)^{th}$ field and pixel P(x-1, y) of the $(i+1)^{th}$ field, the predetermined value is added to the combing accumulation as the combing accumulation.

According to an exemplary embodiment of the present invention, the step of "respectively comparing the combing detection result with a plurality of models" includes comparing m combing numbers with a plurality of 2:2 film models and comparing the m combing numbers with a plurality of 3:2 film models. In an exemplary embodiment of the present invention, the "specific de-interlace format" includes BOB, forward weave, and backward weave.

According to the present invention, combing detection is performed to a plurality of successive fields, and the combing detection result is compared with a plurality of built-in models to determine a suitable de-interlace format for the received video, thus, precise film detection can be performed, accordingly the successive fields can be de-interlaced appropriately.

In order to make the aforementioned and other objects, features and advantages of the present invention comprehensible, a preferred embodiment accompanied with figures is described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIGS. 10A and 10B respectively illustrate pixel dispositions in fields of same combing type or different combing types.

DESCRIPTION OF EMBODIMENTS

Figure 1A:
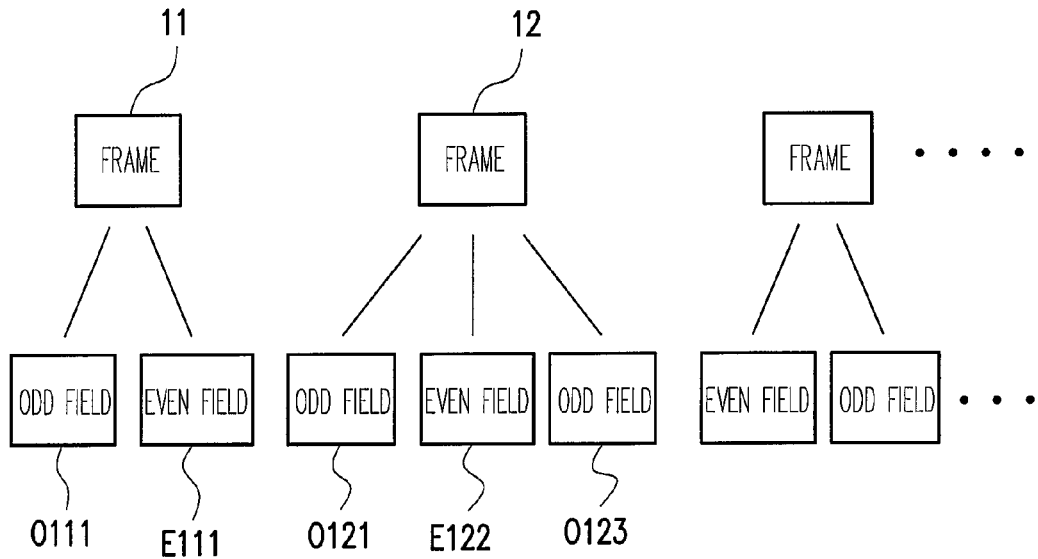
FIGS. 1A and 1B are diagrams respectively illustrating conventional 3:2 pull-down and 2:2 pull-down.
Figure 4:
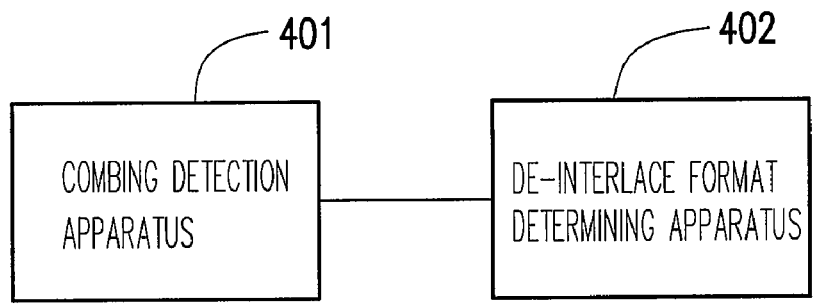
FIG. 4 is a block diagram of a video de-interlace apparatus according to an embodiment of the present invention.

FIG. 4 is a block diagram of a video de-interlace apparatus according to an embodiment of the present invention. The video de-interlace apparatus includes a combing detection apparatus 401 and a de-interlace format determining apparatus 402. The combing detection apparatus 401 receives a plurality of successive fields, performs combing detection to the fields, and outputs a combing detection result. Assuming that in the present embodiment, the combing detection apparatus 401 receives the fields O111, E111, O121, E122, and O123 as shown in FIG. 1A, the combing detection apparatus 401 then starts to perform combing detection so as to determine whether there is combing in the successive fields. With FIG. 1A as example, fields O111 and E111 are from the same frame 11, thus, there won't be any combing in fields O111 and E111. However, fields E111 and O121 are from different frames, so combing may be produced in these two fields. If "1" is used for denoting combing and "0" for no combing, as shown in FIG. 1A, the combing detection result is "01001". While in FIG. 1B, the combing detection result is "010101".

Next, the de-interlace format determining apparatus 402 receives the combing detection result output by the combing detection apparatus 401 and compares the combing detection result with a plurality of models stored therein. The models stored in the de-interlace format determining apparatus 402 may be "01001" of 3:2 film format or "010101" of 2:2 film format etc. With the 3:2 film format in FIG. 1A as example, if the combing detection result conforms to a model "01001" of 3:2 film format, the de-interlace format determining apparatus 402 then decides to perform forward weave to field O111, backward weave to field E111, forward weave to field O121, backward weave (or forward weave) to field E122, and backward weave to field O123.

Figure 5:
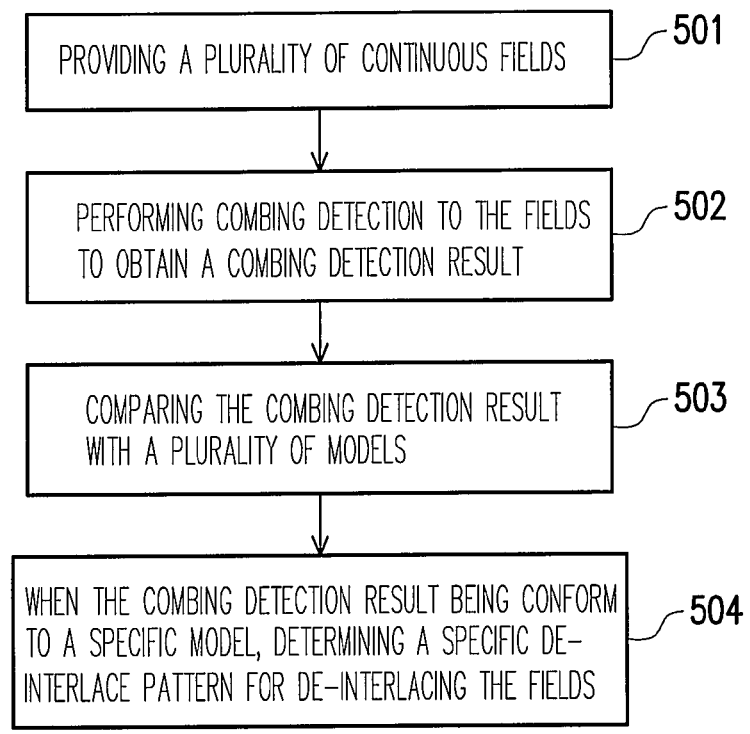
FIG. 5 is a flowchart illustrating the video de-interlace method according to an embodiment of the present invention.

From foregoing example, the present invention further provides a video de-interlace method, and the flowchart thereof is illustrated in FIG. 5. First, a plurality of successive fields are provided (step 501). Next, combing detection is performed to the fields to obtain a combing detection result (step 502). The combing detection result is respectively compared with a plurality of models (step 503), wherein each model corresponds to a de-interlace format. When the combing detection result conforms to a specific model among the models, a specific de-interlace format corresponding to the specific model is used for de-interlacing the fields (step 504).

It should be noted that even though a possible format of video de-interlace method and apparatus has been described in foregoing embodiment, it should be understood by those having ordinary skill in the art that the designs of video de-interlace method and apparatus from various manufactures are all different, thus, the present invention should not be limited to the possible format described above. In other words, any apparatus or method that performs combing detection to successive fields and compares the combing detection result with built-in models to obtain suitable deinterlace format is construed to be within the scope of the present invention.

An exemplary embodiment of the present invention will be described below so that those having ordinary skill in the art can easily implement the present invention.

Figure 6:
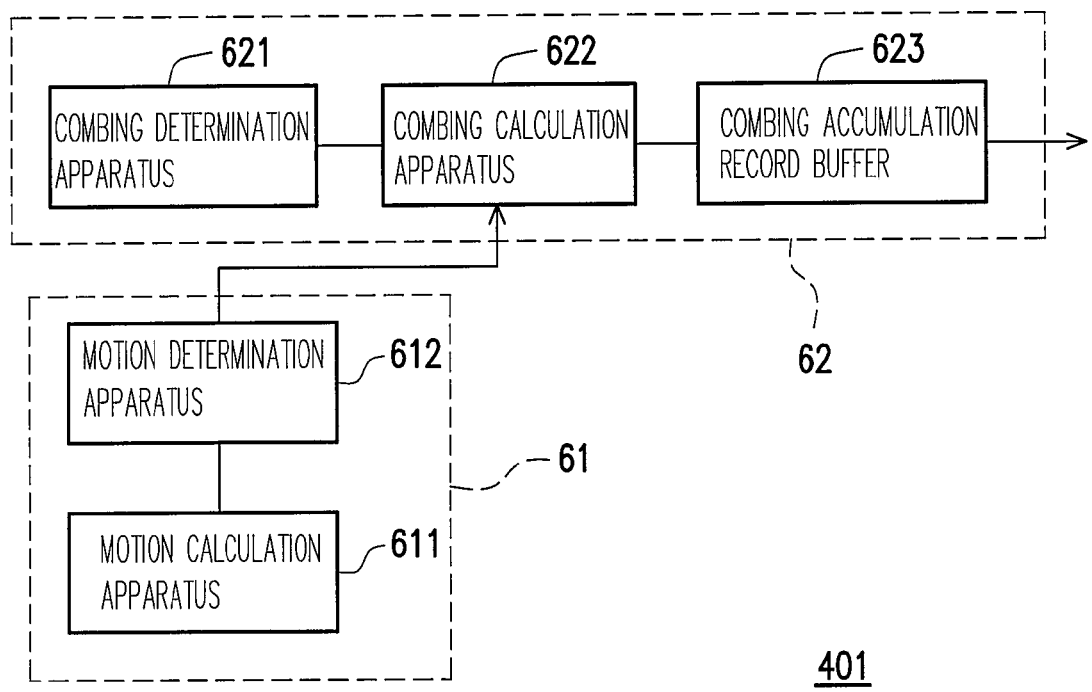
FIG. 6 is a detail block diagram of the combing detection apparatus 401 in FIG. 4.

FIG. 6 is a detailed block diagram of the combing detection apparatus 401 in FIG. 4. Referring to FIG. 6, the combing detection apparatus 401 includes a motion detection apparatus 61 and a combing detector 62. Wherein the combing detector 62 includes a combing determination apparatus 621, a combing calculation apparatus 622, and a combing accumulation record buffer 623. The motion detection apparatus 61 includes a motion calculation apparatus 611 and a motion determination apparatus 612.

The combing determination apparatus 621 detects whether there is combing at where an object moved according to the moved part of the object between adjacent fields detected by the motion detection apparatus 61. The combing calculation apparatus 622 counts the combings detected by the combing determination apparatus 621. The combing accumulation record buffer 623 receives and stores the combing number output by the combing calculation apparatus 622. For example, the combing accumulation record buffer 623 may store the combing number of the first and the second field as the first combing number, the combing number of the second and the third field as the second combing number, the combing number of the third and the fourth field as the third combing number, and so on, and these assorted combing numbers may be used as the aforementioned combing detection result. The implementations of main circuit blocks in foregoing embodiment will be described in detail below.

Figure 7:
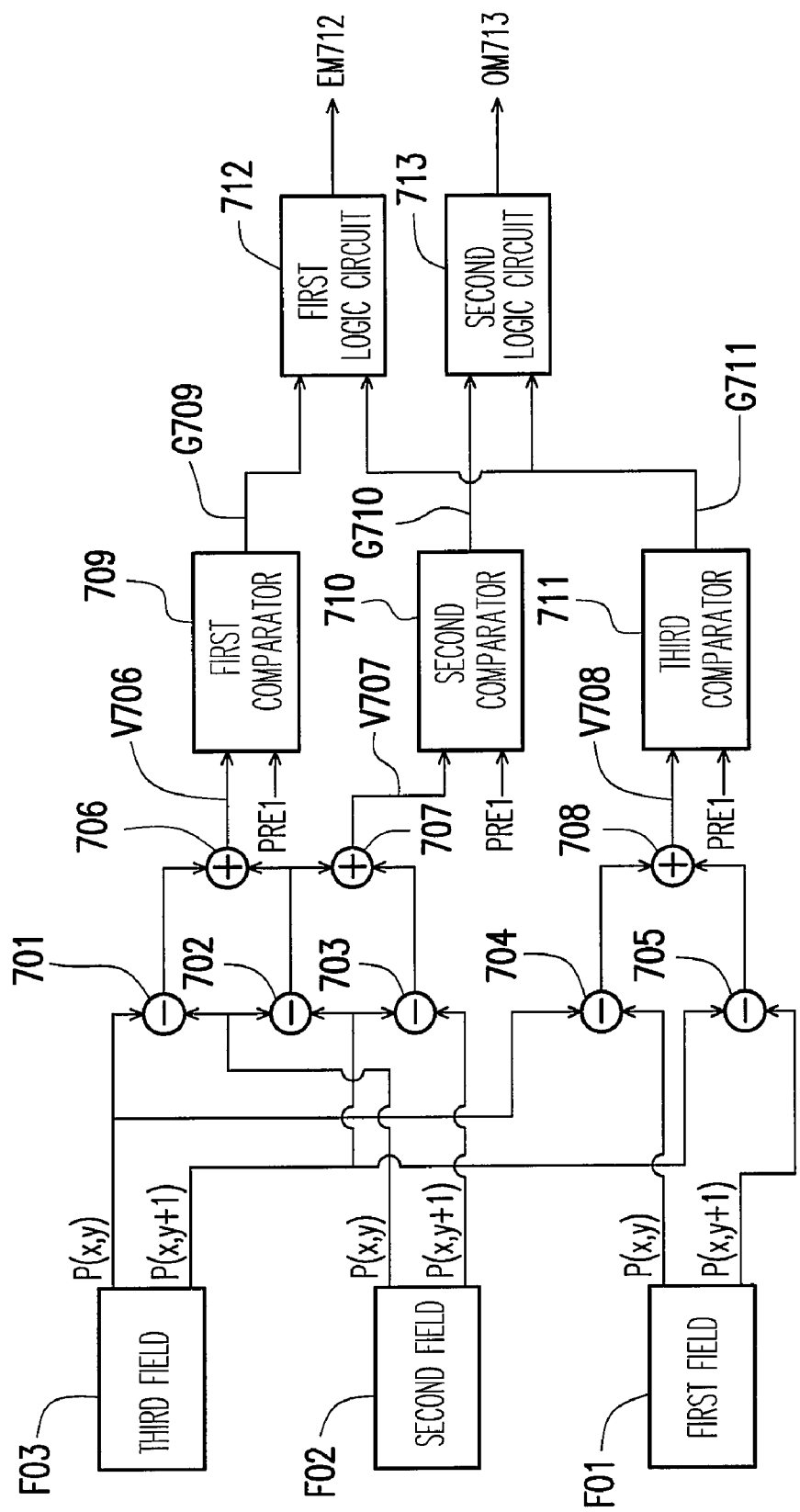
FIG. 7 is a detail circuit diagram of the motion detection apparatus 61 in FIG. 6.

FIG. 7 is a detail circuit diagram of the motion detection apparatus 61 in FIG. 6. Referring to FIG. 7, the motion calculation apparatus 611 includes a first subtractor 701, a second subtractor 702, a third subtractor 703, a fourth subtractor 704, a fifth subtractor 705, a first adder 706, a second adder 707, and a third adder 708. The motion determination apparatus 612 includes a first comparator 709, a second comparator 710, a third comparator 711, a first logic circuit 712, and a second logic circuit 713.

First, the motion detection apparatus 61 for detecting the motions of the first field F01, the second field F02, and the third field F03 will be described. Here pixels of each field are denoted as P(x, y), wherein x represents the horizontal position of a pixel and y represents the vertical position thereof. The first subtractor 701 performs subtraction to pixel P(x, y) of the third field F03 and pixel P(x, y) of the second field F02 and outputs a first difference. The second subtractor 702 performs subtraction to pixel P(x, y+1) of the third field F03 and pixel P(x, y) of the second field F02 and outputs a second difference. The third subtractor 703 performs subtraction to pixel P(x, y+1) of the third field F03 and pixel P(x, y+1) of the second field F02 and outputs a third difference. The fourth subtractor 704 performs subtraction to pixel P(x, y) of the third field F03 and pixel P(x, y) of the first field F01 and outputs a fourth difference. The fifth subtractor 705 performs subtraction to pixel P(x, y+1) of the third field F03 and pixel P(x, y+1) of the first field F01 and outputs a fifth difference.

Figure 8:
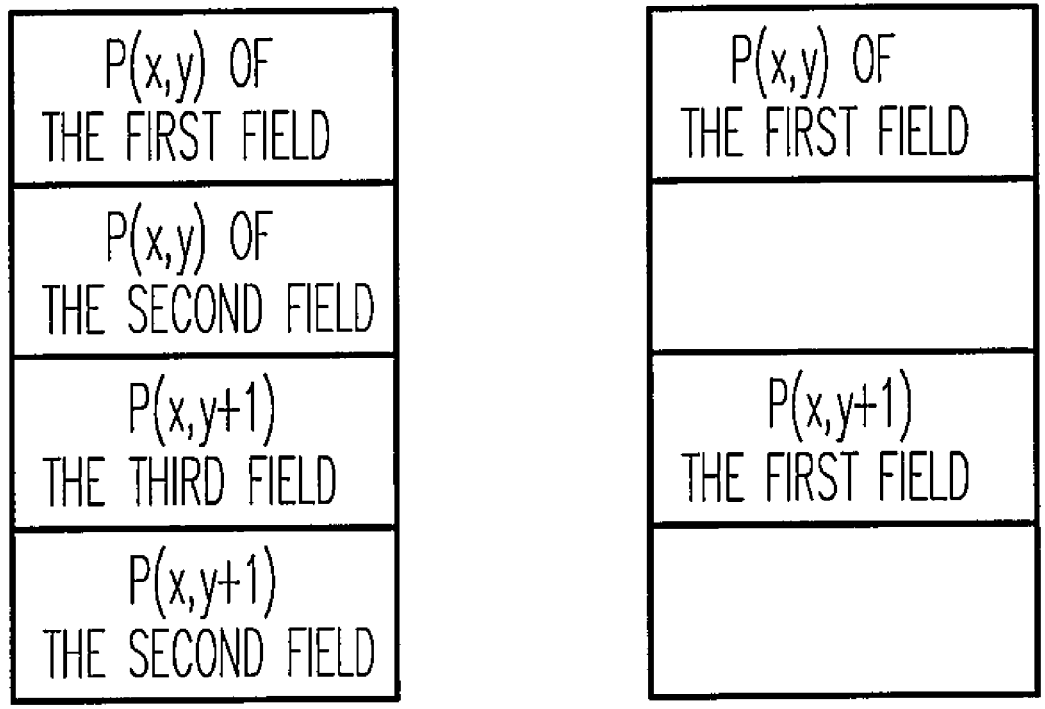
FIG. 8 illustrates the pixel dispositions in fields F03, F02, and F01 in FIG. 7.

The first adder 706 adds the first difference to the second difference and outputs a first sum V706. The second adder 707 adds the second difference to the third difference and outputs a second sum V707. The third adder 708 adds the fourth difference to the fifth difference and outputs a third sum V708. Next, the motion determination apparatus 612 determines pixels in which column (i.e. axis y) have motions according to the first, the second, and the third sum. Here it is assumed that the third field F03 is an odd field (namely, a field having 1, 3, 5, . . . odd number of scan lines), the second field F02 is an even field, and the first field F01 is an odd field. If the fields F03 and F02 are wove into one frame, the pixels thereof will be disposed in the frame as illustrated in FIG. 8.

Thereafter, the first comparator 709, the second comparator 710, and the third comparator 711 respectively receive the first sum V706, the second sum V707, the third sum V708, and a first predetermined value PRE1, and respectively output a first determination signal G709, a second determination signal G710, and a third determination signal G711. When the first sum V706 is greater than or equal to the first predetermined value PRE1, the first determination signal G709 is enabled. When the second sum V707 is greater than or equal to the first predetermined value PRE1, the second determination signal G710 is enabled. When the third sum V708 is greater than or equal to the first predetermined value PRE1, the third determination signal G711 is enabled.

The first logic circuit 712 receives the first determination signal G709 and the third determination signal G711 and outputs an even pixel movement signal EM712. When both the first determination signal G709 and the third determination signal G711 are enabled, pixel P(x, y) of the third field F03 and pixel P(x, y) of the second field F02 have motion, so the first logic circuit 712 enables the even pixel movement signal EM712. The second logic circuit 713 receives the second determination signal G710 and the third determination signal G711 and outputs an odd pixel movement signal OM713. When both the second determination signal G710 and the third determination signal G711 are enabled, pixel P(x, y+1) of the third field F03 and pixel P(x, y+1) of the second field F02 having motion, so that the second logic circuit 713 enables the odd pixel movement signal OM713. The combing detector 62 receives the even pixel movement signal EM712 and the odd pixel movement signal OM713.

Figure 9:
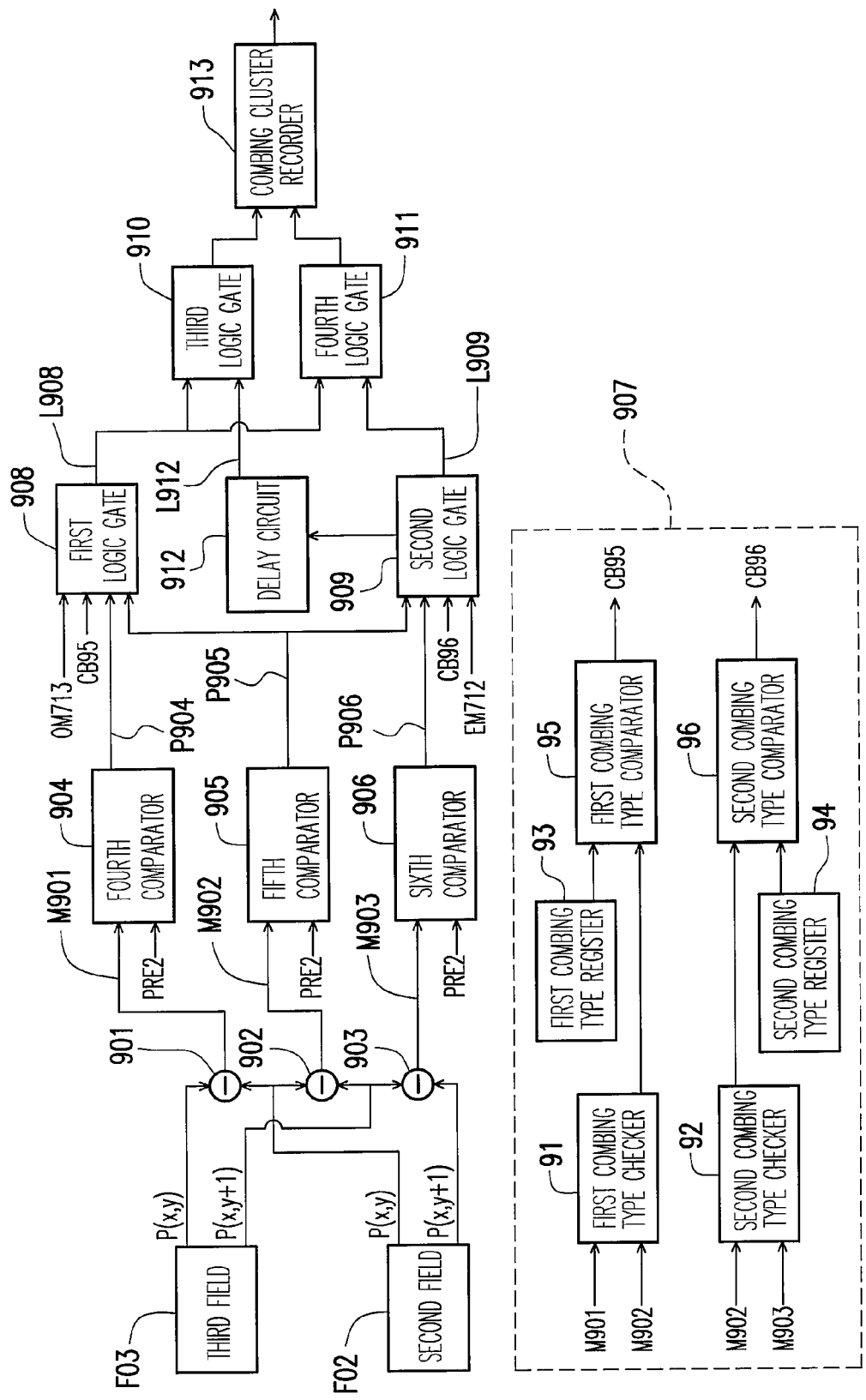
FIG. 9 is a detail circuit diagram of the combing determination apparatus 621 and the combing calculation apparatus 622 in FIG. 6.

FIG. 9 is a detail circuit diagram of the combing determination apparatus 621 and the combing calculation apparatus 622 in FIG. 6. Referring to FIG. 9, the combing determination apparatus 621 includes a sixth subtractor 901, a seventh subtractor 902, an eighth subtractor 903, a fourth comparator 904, a fifth comparator 905, a sixth comparator 906, and a combing checking apparatus 907. The combing checking apparatus 907 includes a first combing type checker 91, a second combing type checker 92, a first combing type register 93, a second combing type register 94, a first combing type comparator 95, and a second combing type comparator 96. The combing calculation apparatus 622 includes a first logic gate 908, a second logic gate 909, a third logic gate 910, a fourth logic gate 911, a delay circuit 912, and a combing cluster recorder 913.

The combing calculation apparatus receives pixel P(x, y), pixel P(x, y+1) of the second field F02 and pixel P(x, y), pixel P(x, y+1) of the third field F03. The sixth subtractor 901, the seventh subtractor 902, and the eighth subtractor 903 calculate the foregoing pixels to obtain a sixth difference M901, a seventh difference M902, and an eighth difference M903, wherein the sixth difference M901 is the difference between pixel P(x, y) of the third field F03 and pixel P(x, y) of the second field F02, the seventh difference M902 is the difference between pixel P(x, y) of the second field F02 and pixel P(x, y+1) of the third field, and the eighth difference M903 is the difference between pixel P(x, y+1) of the second field F02 and pixel P(x, y+1) of the third field F03.

Next, the sixth difference M901, the seventh difference M902, and the eighth difference M903 are respectively sent to the fourth comparator 904, the fifth comparator 905, the sixth comparator 906, and the first combing type checker 91 and the second combing type checker 92 of the combing checking apparatus 907. The fourth comparator 904, the fifth comparator 905, and the sixth comparator 906 further receive a second predetermined value PRE2. When the absolute value of the sixth difference M901 is greater than the second predetermined value PRE2, the first comparison signal P904 output by the fourth comparator 904 is enabled. When the absolute value of the seventh difference M902 is greater than the second predetermined value PRE2, the second comparison signal P905 output by the fifth comparator 905 is enabled. When the absolute value of the eighth difference M903 is greater than the second predetermined value PRE2, the third comparison signal P906 output by the sixth comparator 906 is enabled.

Figures 10A, 10B:
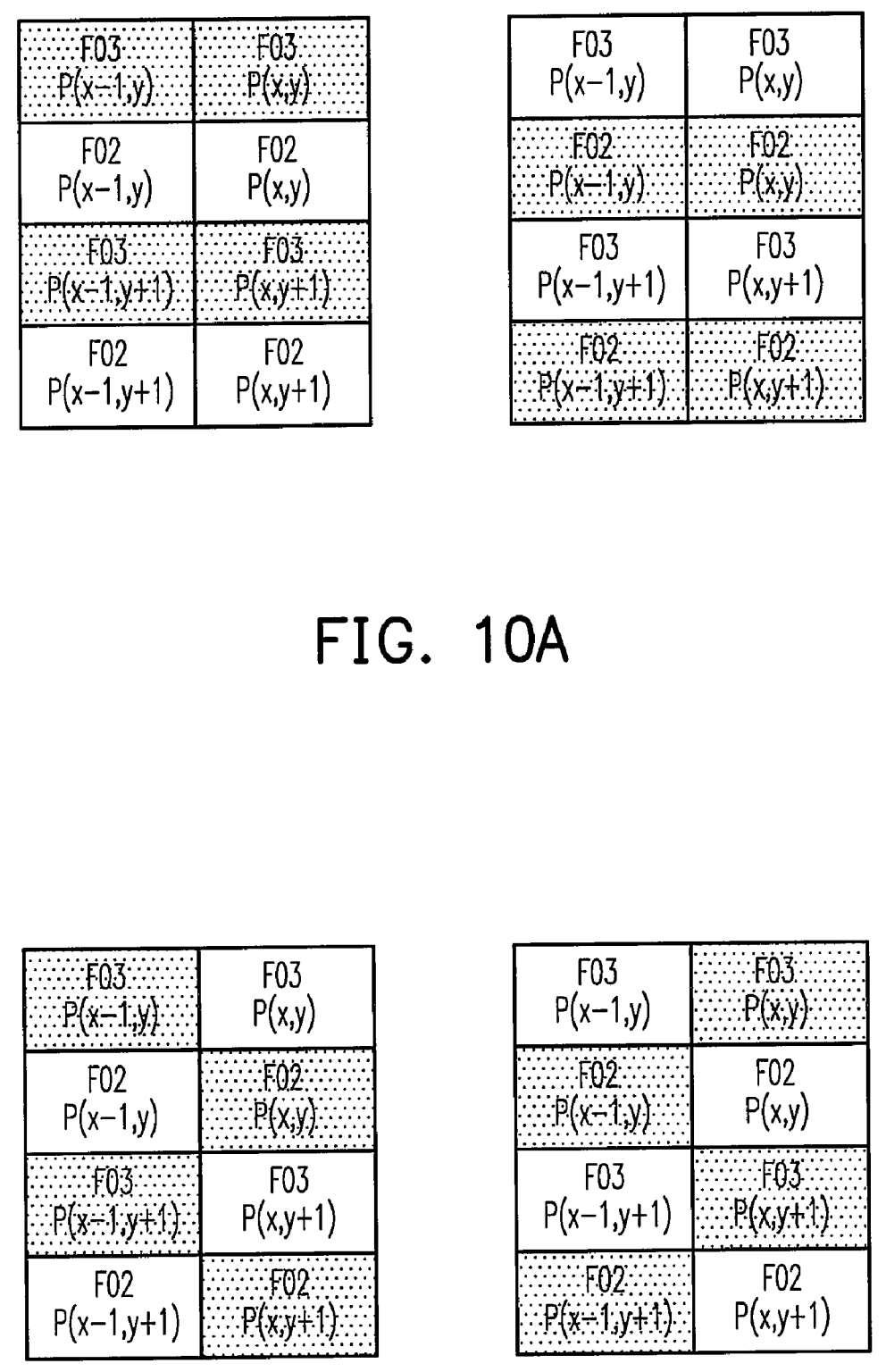

The combing checking apparatus 907 is mainly adopted for checking whether the combing type composed of pixel P(x, y), pixel P(x, y+1) of the third field F03 and pixel P(x, y), pixel P(x, y+1) of the second field F02 is the same as the combing type composed of pixel P(x−1, y), pixel P(x−1, y+1) of the third field F03 and pixel P(x−1, y), pixel P(x−1, y+1) of the second field F02. Refer to FIGS. 10A and 10B, FIG. 10A illustrates an example of same combing type, and FIG. 10B illustrates an example of different combing types. Generally speaking, combing refers to the interlaced brightness situation pixels present. When an object in a picture moves drastically and fields are woven incorrectly, combing may be produced at the edge of the object. Generally speaking, to avoid misjudgment, the situation illustrated in FIG. 10A conforms to combing, while the situation illustrated in FIG. 10B will be treated as noise at the edge of the object or noise of the image. The functions of various components in the combing checking apparatus 907 will be explained below.

The first combing type checker 91 receives the sixth difference M901 and the seventh difference M902, and determines the combing type of pixel P(x, y), pixel P(x, y+1) of the third field F03 and pixel P(x, y) of the second field F02 according to the differences M901 and M902. First, pixel P(x, y) and pixel P(x, y+1) of the third field F03 are assumed to be duller pixels, and pixel P(x, y) and pixel P(x, y+1) of the second field F02 are assumed to be brighter pixels, as illustrated in the left diagram in FIG. 10A. Thus, the sixth difference M901 should be negative, and the seventh difference M902 should be positive. Accordingly, the combing type can be determined as "dull/bright/dull". Similarly, the second combing type checker 92 receives the seventh difference M902 and the eighth difference M903 for determining the combing type of pixel P(x, y), pixel P(x, y+1) of the second field F02 and pixel P(x, y+1) of the third field F03.

Next, the first combing type register 93 stores the combing type of pixel P(x−1, y), pixel P(x−1, y+1) of the third field F03 and pixel P(x−1, y) of the second field F02, and the second combing type register 94 stores the combing type of pixel P(x−1, y), pixel P(x−1, y+1) of the second field F02 and pixel P(x−1, y) of the third field F03. Next, the first combing type comparator 95 compares the combing type of pixel P(x, y), pixel P(x, y+1) of the third field F03 and pixel P(x, y) of the second field F02 with the combing type of pixel P(x−1, y), pixel P(x−1, y+1) of the third field F03 and pixel P(x−1, y) of the second field F02. When the two combing types are the same, the first combing type comparator 95 outputs and enables a first combing determination signal CB95. The second combing type comparator 96 compares the combing type of pixel P(x, y), pixel P(x, y+1) of the second field F02 and pixel P(x, y+1) of the third field F03 with the combing type of pixel P(x−1, y), pixel P(x−1, y+1) of the second field F02 and pixel P(x−1, y+1) of the third field F03. When the two combing types are the same, the second combing type comparator 96 outputs and enables a second combing determination signal CB96.

The combing calculation apparatus 622 determines whether there is combing in pixel P(x, y), pixel P(x, y+1) of the third field F03 and pixel P(x, y), pixel P(x, y+1) of the second field F02 according to the first combing determination signal CB95, the second combing determination signal CB96, the first comparison signal P904, the second comparison signal P905, the third comparison signal P906, the even pixel movement signal EM712, and the odd pixel movement signal OM713. If there is combing, the combing calculation apparatus 622 accumulates a combing accumulation until all the pixels in the third and the second field have been processed, and then the combing calculation apparatus 622 outputs the combing accumulation. The operations of various components in the combing calculation apparatus 622 will be respectively explained below.

In the present embodiment, it is assumed that when the first combing determination signal CB95, the second combing determination signal CB96, the first comparison signal P904, the second comparison signal P905, the third comparison signal P906, the even pixel movement signal EM712, and the odd pixel movement signal OM713 are at logic high voltage level when they are enabled. In addition, it is assumed that the first logic gate 908, the second logic gate 909, the third logic gate 910, and the fourth logic gate 911 are all AND gates.

First, the first logic gate 908 receives the first combing determination signal CB95, the odd pixel movement signal OM713, the first comparison signal P904, and the second comparison signal P905, and outputs a first logic signal L908. When the first combing determination signal CB95, the odd pixel movement signal OM713, the first comparison signal P904, and the second comparison signal P905 are all enabled (in the present embodiment, all at logic high voltage level), pixels P(x, y) of the second field F02 and the third field F03 have motions and the brightness difference between pixel P(x, y) of the third field F03 and pixel P(x, y) of the second field F02 is greater than the second predetermined value PRE2 and the brightness difference between pixel P(x, y+1) of the third field F03 and pixel P(x, y) of the second field F02 is greater than the second predetermined value PRE2, the first logic signal L908 output by the first logic gate 908 is at logic high voltage level.

Similarly, the second logic gate 909 receives the second combing determination signal CB96, the even pixel movement signal EM714, the second comparison signal P905, and the third comparison signal P906 and outputs a second logic signal L909. When the second combing determination signal CB96, the even pixel movement signal EM714, the second comparison signal P905, and the third comparison signal P906 are all enabled (in the present embodiment, all at logic high voltage level), pixels P(x, y+1) of the second field F02 and the third field F03 have motions and the brightness difference between pixel P(x, y+1) of the third field F03 and pixel P(x, y) of the second field F02 is greater than the second predetermined value PRE2, and the brightness difference between pixel P(x, y+1) of the third field F03 and pixel P(x, y+1) of the second field F02 is greater than the second predetermined value PRE2, the second logic signal L909 output by the second logic gate 909 is at logic high voltage level.

The delay circuit 912 is coupled to the second logic gate 909 for receiving and outputting a second delayed logic signal DL912 after delaying the second logic signal L912 for a predetermined time. The third logic gate 910 is coupled to the first logic gate 908 and the delay circuit 912 for receiving the first logic signal L908 and the second delayed logic signal DL912 output by the delay circuit and outputting a third logic signal L910. When the first logic signal L908 and the second delayed logic signal DL910 are both at logic high voltage level, the third logic signal is at logic high voltage level. The fourth logic gate 911 is coupled to the first logic gate 908 and the second logic gate 909 for receiving the first logic signal L908 and the second logic signal L909 and outputting a fourth logic signal L911. When the first logic signal L908 and the second logic signal L909 are both at logic high voltage level, the fourth logic gate 911 sets the fourth logic signal L911 to logic high voltage level.

To make those having ordinary skill in the art understand the embodiment described above, the following conditions are assumed: pixel P(x, y) and pixel P(x, y+1) of the second field F02 are brighter pixels, pixel P(x, y+1) of the third field F03 is duller pixel, which means the combing type presented by the three pixels is "bright/dull/bright". Thus, whether pixel P(x, y) of the third field F03 is "dull" pixel has to be determined, so that the fourth logic gate 911 needs to receive the first logic signal L908 and the second logic signal L909. If the second logic signal L909 being at logic high voltage level represents that pixel P(x, y) of the second field F02, pixel P(x, y+1) of the third field F03, and pixel P(x, y+1) of the second field F02 present "bright/dull/bright" type in the present embodiment, then the first logic signal L908 being at logic high voltage level represents that pixel P(x, y) of the third field F03, pixel P(x, y) of the second field F02, and pixel P(x, y+1) of the third field F03 present "dull/bright/dull" type, which implies that pixel P(x, y) of the third field F03 is "dull".

Similarly, if the first logic signal L908 being at logic high voltage level represents that pixel P(x, y) of the third field F03, pixel P(x, y) of the second field F02, and pixel P(x, y+1) of the third field F03 present "dull/bright/dull", so the previous second logic signal L909 is required to prove that pixel P(x, y−1) of the second field F02 is "bright", accordingly, the previous second logic signal L909 needs to be delayed a predetermined time by the delay circuit 912.

Next, the combing cluster recorder 913 is coupled to the third logic gate 910 and the fourth logic gate 911 for receiving and recording the third logic signal L910 and the fourth logic signal L911, and the combing cluster recorder 913 counts the number of the third logic signal L910 and the fourth logic signal L911 being logic high voltage level within pixel P(x, y)~P(x−k, y−k). When the foregoing number is greater than a cluster predetermined value, the combing cluster recorder 913 adds the number to the combing accumulation to serve as the combing accumulation. To put it simply, such result may still be considered image noise even it is determined that pixel P(x, y) of the third field F03, pixel P(x, y) of the second field F02, pixel P(x, y+1) of the third field F03, and pixel P(x, y+1) of the second field F02 present the combing of "dull/bright/dull/bright" through foregoing strict logic determination, thus, a safer mechanism is set up in the present exemplary embodiment, namely, the images at left, top left, and top of the image are all made combings besides the four pixels, and the combing cluster recorder 913 only counts the combings when the number of combings is greater than the foregoing cluster predetermined value. The combing cluster recorder 913 outputs the combing accumulations of the fields F02 and F03 after all the pixels in the fields F02 and F03 have been processed.

It should by understood by those having ordinary skill in the art from the description of the foregoing embodiment that the combing cluster recorder 913 may also be replaced by a common accumulator, which means the embodiment of the present invention may also be implemented without the foregoing safe mechanism, wherein only the combing number of the entire image is counted, and the number of the third logic gate 910 and the fourth logic gate 911 outputting logic high voltage levels is counted by the accumulator when there is less image noises. Similarly, the combing checking apparatus 907 is not essential and which is designed only for possible misjudgment caused by image noises. The combing checking apparatus 907 can be skipped if there is few image noise or image noise has been predetermined.

Next, the combing accumulation record buffer 623 stores several combing accumulations for the subsequent de-interlace format determining apparatus 402 to determine a de-interlace format for de-interlacing the fields. Circuit blocks of the de-interlace format determining apparatus 402 will be described in detail below.

Figure 11:
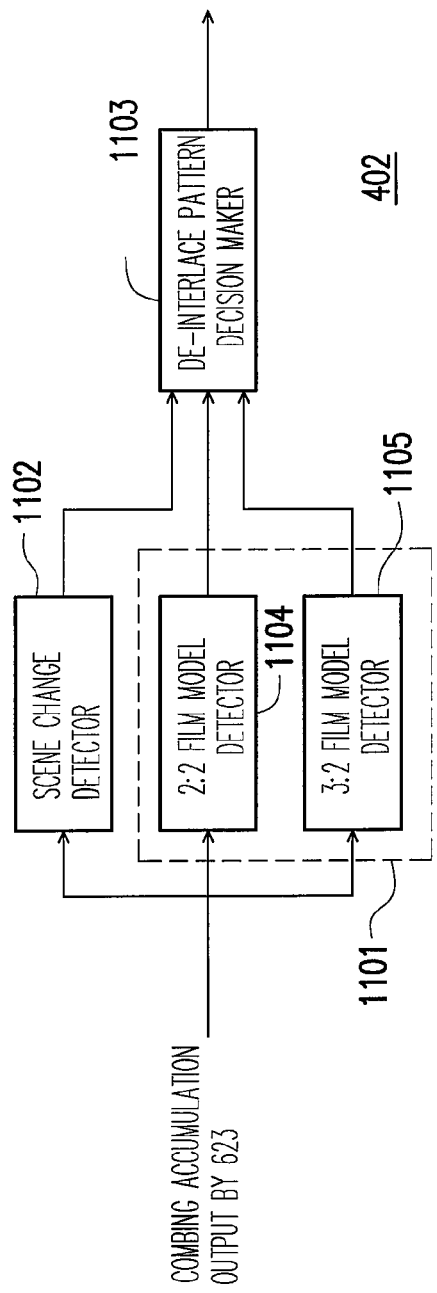
FIG. 11 is a detail circuit diagram of the de-interlace format determining apparatus 402.

FIG. 11 is a detailed circuit diagram of the de-interlace format determining apparatus 402. Referring to FIG. 11, the de-interlace format determining apparatus 402 includes a film model detector 1101, a scene change detector 1102, and a de-interlace format decision maker 1103, wherein the film model detector 1101 further includes a 2:2 film model detector 1104 and a 3:2 film model detector 1105. In the present embodiment, the film model detector 1101 and the scene change detector 1102 receives the combing accumulations output by the combing accumulation record buffer 623 to determine whether the fields being in 2:2 film format, 3:2 film format, or none of the two, and sends the determination result to the de-interlace format decision maker 1103. The de-interlace format decision maker 1103 finds out the corresponding de-interlace format according to the determination result output by the film model detector 1101 and the scene change detector 1102 and de-interlaces the fields. The circuits and operations thereof in the embodiment described above will be described in detail below.

Figure 12:
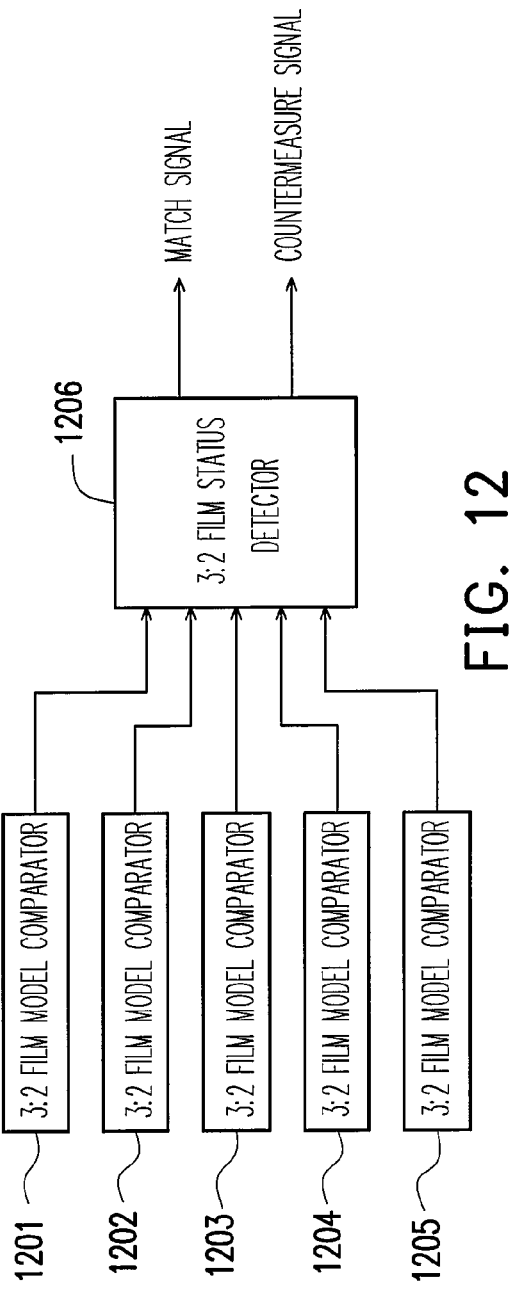
FIG. 12 is a detail circuit diagram of the 3:2 film model detector 1105 in FIG. 11.

FIG. 12 is a detail circuit diagram of the 3:2 film model detector 1105 in FIG. 11. Referring to FIG. 12, in the present embodiment, the 3:2 film model detector 1105 includes five 3:2 film model comparators (1201~1205 in FIG. 12) and a 3:2 film status detector 1206.

Before describing the present embodiment, it is assumed that the combing accumulation record buffer 623 records five combing accumulations. It is then assumed that an algebra is used for showing the relationships between the five combing accumulations and the fields respectively as following: the first combing accumulation is the combing number of the $i^{th}$ field and the $(i+1)^{th}$ field, the second combing accumulation is the combing number of the $(i+1)^{th}$ field and the $(i+2)^{th}$ field, the third combing accumulation is the combing number of the $(i+2)^{th}$ field and the $(i+3)^{th}$ field, the fourth combing accumulation is the combing number of the $(i+3)^{th}$ field and the $(i+4)^{th}$ field, and the fifth combing accumulation is the combing number of the $(i+4)^{th}$ field and the $(i+5)^{th}$ field.

After that, it is assumed that the 3:2 film model stored in the first 3:2 film model comparator 1201 is "big/small/big/small/small", the 3:2 film model stored in the second 3:2 film model comparator 1202 is "small/big/small/small/big", the 3:2 film model stored by the third 3:2 film model comparator 1203 is "big/small/small/big/small", the 3:2 film model stored in the fourth 3:2 film model comparator 1204 is "small/small/big/small/big", and the 3:2 film model stored in the fifth 3:2 film model comparator 1204 is "small/big/small/big/small". The embodiment in FIG. 12 will be described below with foregoing assumptions.

The 3:2 film model comparators 1201~1205 respectively receive the first to the fifth combing accumulations and compare the combing accumulations with the film models stored in the 3:2 film model comparators. If the fields received are fields from a normal video, and each field belongs to different image in the situation of normal motion, so the first to fifth combing accumulations should be "big/big/big/big/big". If the received fields are fields in film format (regardless of 2:2 or 3:2 format), the first to the fifth combing accumulations should contain both "big" and "small". Referring to FIG. 1A again, assuming that the fields are in 3:2 film format as shown in FIG. 1A, ideally, the detection result output by the combing detection apparatus 401 should be "no combing, combing, no combing, no combing, combing", "combing, no combing, no combing, combing, no combing", "no combing, no combing, combing, no combing, combing", "no combing, combing, no combing, no combing, combing", or "no combing, combing, no combing, combing, no combing".

However, if the fields have noises, threshold may be set for defining "no coming" and "combing" at designing the circuit or the software. For example, it can be assumed to be "no combing" when a combing accumulation is less than 20, namely, "small" in the present embodiment, and "combing" when the combing accumulation is larger than 200, namely, "big" in the present embodiment. However, sometimes the combing accumulation may be between 20 and 200, so the combing status thereof cannot be determined, thus, each of the 3:2 film model comparators 1201~1205 compares the first to the fifth combing accumulations it received with the film model therein (i.e. the foregoing "big/small/big/small/small", "small/big/small/small/big", "big/small/small/big/small", "small/small big/small/big", and "small/big/small/big/small") in sequence and outputs "match", "mismatch", and "unsure" signal respectively.

Next, the 3:2 film status detector 1206 is coupled to the first to fifth 3:2 film model comparators 1201~1205 for receiving the "match", "mismatch", and "unsure" signal output by each of the 3:2 film model comparators 1201~1205. If the second 3:2 film model comparator 1202 output a "match" signal, the first to the fifth combing accumulations are respectively "smaller than 20, greater than 200, smaller than 20, smaller than 20, greater than 200". In other words, the first to the fifth combing accumulations is conforming to the film model of "small/big/small/small/big".

The 3:2 film status detector 1206 outputs a first 3:2 match signal and a first 3:2 countermeasure signal to the de-interlace format decision maker 1103 when the first 3:2 film model comparator 1201 outputs a "match" signal, outputs a second 3:2 match signal and a second 3:2 countermeasure signal to the de-interlace format decision maker 1103 when the second 3:2 film model comparator 1202 outputs a "match" signal, outputs a third 3:2 match signal and a third 3:2 countermeasure signal to the de-interlace format decision maker 1103 when the third 3:2 film model comparator 1203 outputs a "match" signal, outputs a fourth 3:2 match signal and a fourth 3:2 countermeasure signal to the de-interlace format decision maker 1103 when the fourth 3:2 film model comparator 1204 outputs a "match" signal, and outputs a fifth 3:2 match signal and a fifth 3:2 countermeasure signal to the de-interlace format decision maker 1103 when the fifth 3:2 film model comparator 1205 outputs a "match" signal. The de-interlace format decision maker 1103 then determines the de-interlace format according to the specific 3:2 match signal and 3:2 countermeasure signal it received. The operation of the 3:2 film model detector 1105 has been described above.

Similarly, the circuit blocks of the 2:2 film model detector 1104 are similar to those of the 3:2 film model detector 1105, however, unlike the 3:2 film model detector 1105, the 2:2 film model detector 1104 does not need five film model comparators 1201~1205. The 2:2 film model detector 1104 only requires two film model comparators, one for storing "big/small/big/small/big" and the other one for storing "small/big/small/big/small" for determining whether the received fields is in 2:2 film format. The 2:2 film model detector 1104 has been described above and it will not be described hereinafter.

Figure 13:
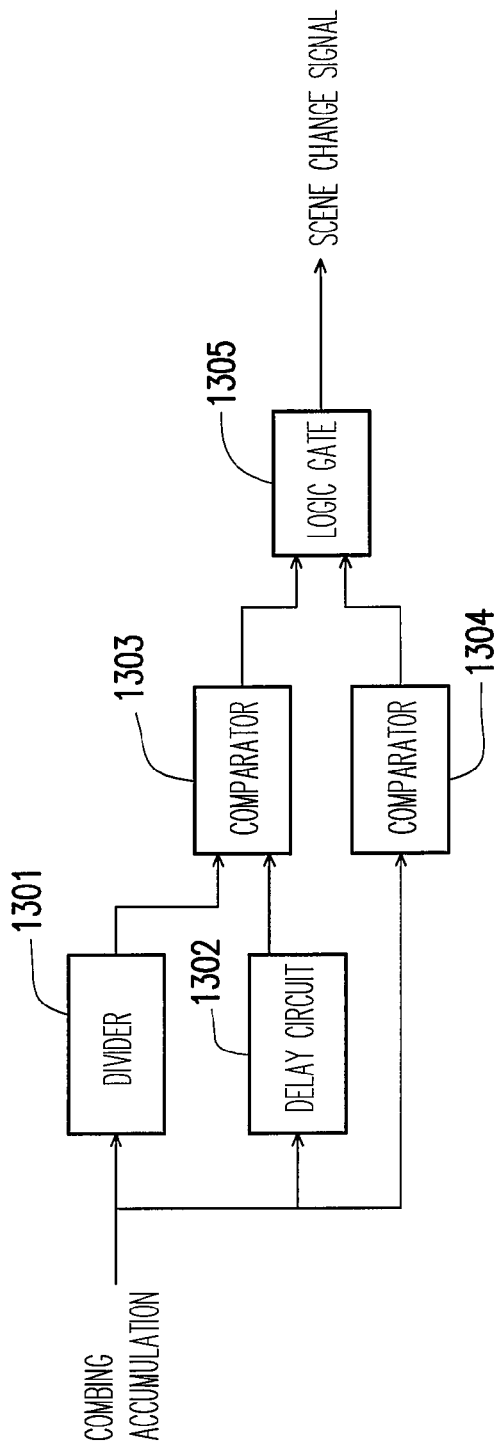
FIG. 13 is a detail circuit diagram of the scene change detector 1102 in FIG. 11.

FIG. 13 is a detail circuit diagram of the scene change detector 1102 in FIG. 11. The scene change detector 1102 receives the combing accumulations and determines whether there is scene change according to the combing accumulations it received. When scene change is determined, the scene change detector 1102 outputs and enables a scene change signal.

Figure 1B:
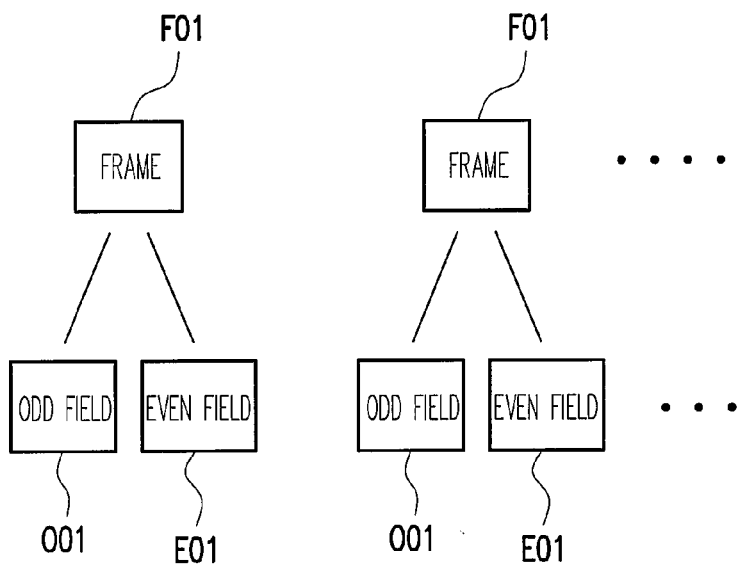
Figure 2:
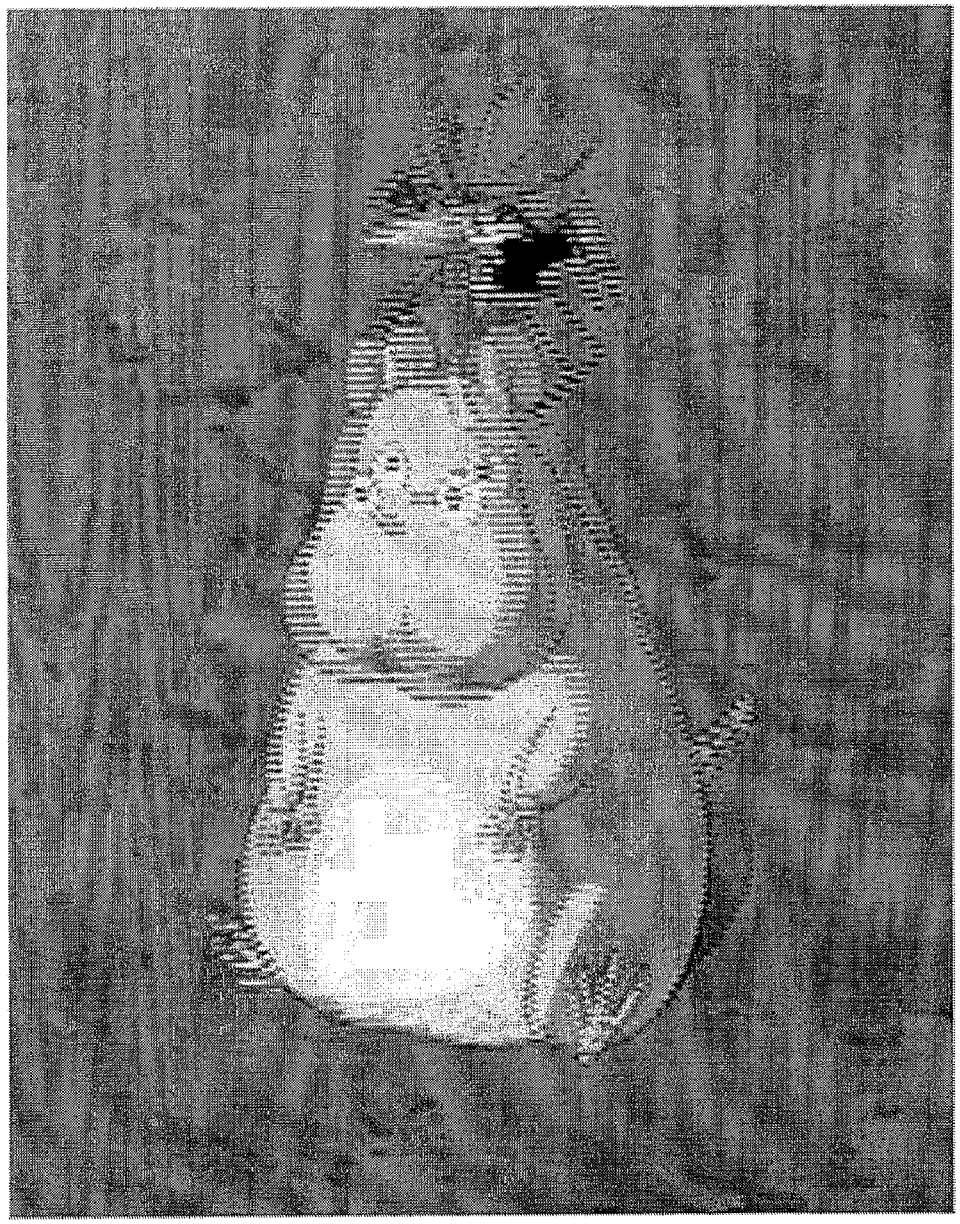
FIG. 2 illustrates conventional combing result caused when two different fields appear in one image.
Figure 3A:
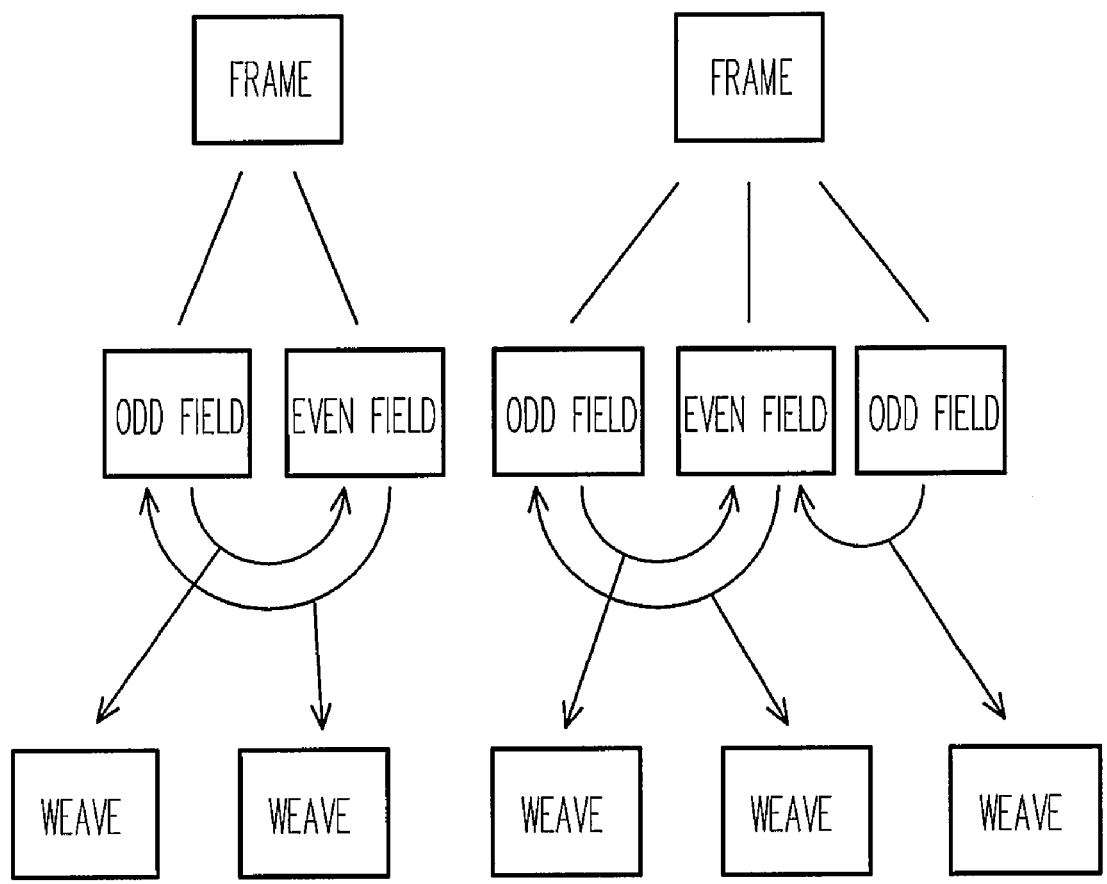
FIGS. 3A and 3B are diagrams respectively illustrating inverse 2:2 pull-down and inverse 3:2 pull-down.
Figure 3B:
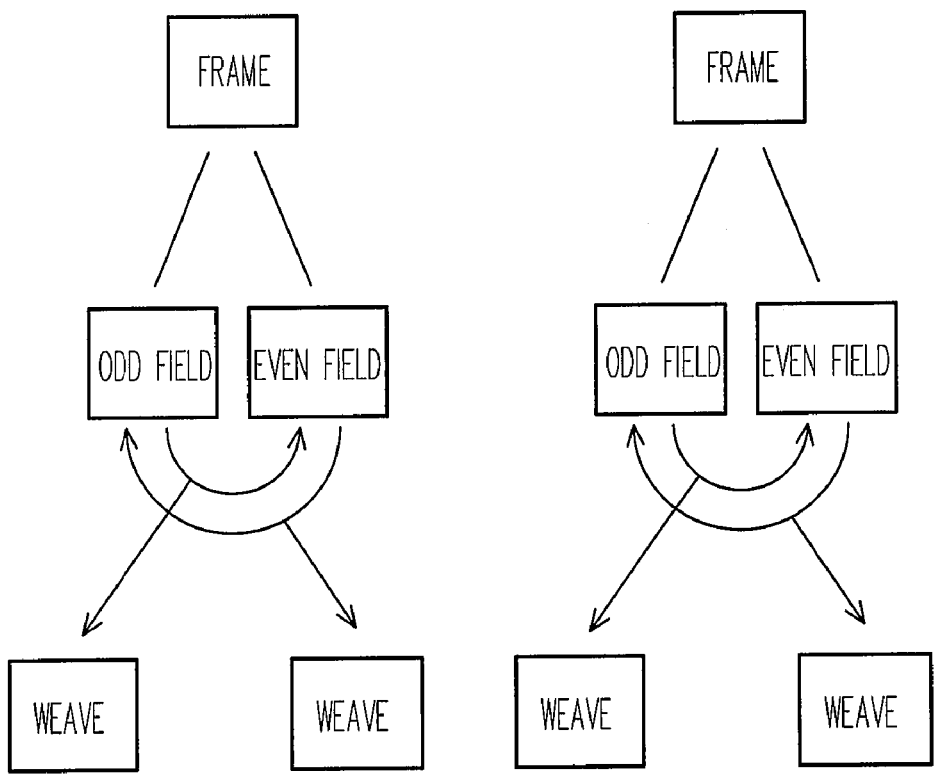

Before explaining the theory of the scene change detector 1102, the part related to telecine will be explained first. Generally speaking, video signals are transmitted in unit of fields. The field format of a film is usually 2:2 film format or 3:2 film format as shown in FIG. 1A and FIG. 1B. For example, when playing a film in TV, even though the film played in the TV may be video signals in 2:2 film format or 3:2 film format, however, when an advertisement is played, fields of the advertisement are inserted in between two fields of the film. If the inserted fields of the advertisement belong to the same frame, a great deal of combings may be produced at de-interlacing these fields. With FIG. 1A as example, if the advertisement is inserted between field E111 and field O111, if the format of 3:2 film format is still used for de-interlacing these fields, the odd field O111 and the fields of the advertisement will be combined into one frame due to incorrect de-interlacing, accordingly incorrect image will be played.

Thus, when scene change is determined, the scene change detector 1102 outputs and enables the scene change signal for resetting the 2:2 film model detector 1104 and the 3:2 film model detector 1105, so that the 2:2 film model detector 1104 and the 3:2 film model detector 1105 re-detect subsequent fields and reset the de-interlace format decision maker 1103 according to the scene change signal to allow the de-interlace format decision maker 1103 to select de-interlace format such as BOB to de-interlace the fields. Accordingly, the foregoing problem of incorrect image caused by incorrect fields weave can be avoided. The operation of the scene change detector 1102 will be described below.

Generally there are two ways to perform BOB. First, the absent pixels (scan lines) in a field are compensated with adjacent pixels (scan lines) in the same picture. For example, if an odd number of scan lines are absent in an even field, an even number of scan lines are directly copied to the odd number of scan lines absent in the even field. Similarly, if an even number of scan lines are absent in an odd field, an odd number of scan lines are directly copied to the even number of scan lines absent in the odd field. Or, the absent scan line is calculated through interpolation by using two adjacent scan lines.

The scene change detector 1102 includes a divider 1301, a delay circuit 1302, comparators 1303 and 1304, and a logic gate 1305. In the present embodiment, an AND gate is still used for implementing the logic gate 1305. the divider 1301 receives a combing accumulation, divides the combing accumulation by a fixed multiple, and outputs the result. The delay circuit 1302 receives the combing accumulation too, and outputs it after delaying for a predetermined time. The comparator 1303 receives the output of the divider 1301 and the combing accumulation is output by the delay circuit 1302, when the value output by the divider 1301 is greater than the value output by the delay circuit 1302, the comparator 1303 outputs a logic high voltage level. The comparator 1304 receives the combing accumulation and compares the combing accumulation with a fourth predetermined value. When the combing accumulation received by the comparator 1304 is greater than the fourth predetermined value, the comparator 1304 outputs a logic high voltage level. The logic gate 1305 outputs a scene change signal and enables the scene change signal when the comparators 1303 and 1304 both output logic high voltage level.

Here scene change is first defined as there being a great deal of combings between two fields. Theoretically, the entire image should have combings after the fields are woven if the two fields belong to different pictures. Thus, condition 1 for scene change is defined as there being a great deal of combings. In other words, the combing accumulation has to be greater than the fourth predetermined value. Next, scene change condition 2 is defined as the combing accumulation being greater than a multiple of the previous combing accumulation. It is defined as scene change if both conditions are true. The embodiment for condition 1 is the comparator 1304, and the embodiment of condition 2 is the divider 1301, the delay circuit 1302, and the comparator 1303. Whether conditions 1 and 2 are conformed to is determined through the logic gate 1305, and the logic gate 1305 enables the scene change signal if both conditions are true.

Figure 14:
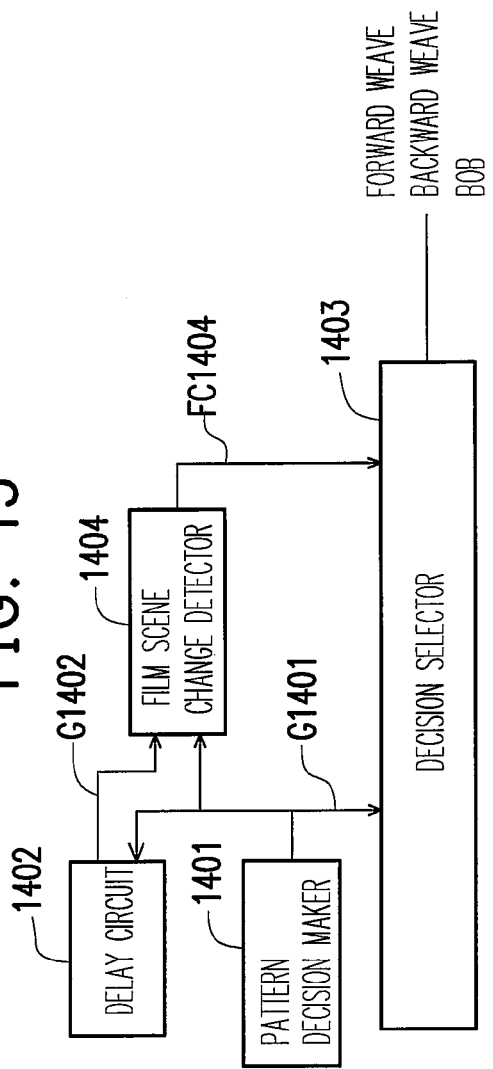
FIG. 14 is a detail circuit diagram of the de-interlace format decision maker 1103 in FIG. 11.

FIG. 14 is a detail circuit diagram of the de-interlace format decision maker 1103 in FIG. 11. Referring to FIG. 14, the de-interlace format decision maker 1103 includes a format decision maker 1401, a delay circuit 1402, a decision selector 1403, and a film scene change detector 1404. The format decision maker 1401 receives the specific 2:2 match signal and the specific 3:2 match signal and outputs a format determination signal G1401. The delay circuit 1402 receives the format determination signal G1401, and outputs a delayed determination signal G1402 after delaying a field time. The decision selector 1403 receives the specific 2:2 countermeasure signal, the specific 3:2 countermeasure signal, and the format decision signal G1401 and select a de-interlace format among a plurality of de-interlace formats for de-interlacing the fields.

The 2:2 film model detector 1105 and the 3:2 film model detector 1105 output two signal to the embodiment in FIG. 14, which are respectively a match signal and a countermeasure signal. If the combing accumulation of the successive fields matches one of the five film model comparators 1201~1205 in the 3:2 film model detector 1105, the 3:2 film model detector 1105 outputs a match signal. Likewise, the 2:2 film model detector 1104 also operates similar to the 2:2 film model detector 1105 and the 3:2 film model detector 1105. In addition, if the combing accumulation of the successive fields conforms to the "small/big/small/small/big" model stored in the film model comparator 1202 in the 3:2 film model detector 1105, the countermeasure signal output by the 3:2 film model detector 1105 is "forward weave, backward weave, forward weave, backward (or forward) weave, backward weave".

The format decision maker 1401 receives the match signals output by the 3:2 film model detector 1105 and the 2:2 film model detector 1104 and the delayed determination signal G1402 output by the delay circuit 1402. If the match signal output by the 3:2 film model detector 1105 denotes "match" and the delayed determination signal G1402 denotes that the 3:2 film model detector 1105 output "match" previously, then the format decision maker 1401 outputs the format determination signal G1401 for controlling the decision selector 1403 so that the decision selector 1403 can further determine a de-interlace format according to the countermeasure signal output by the 3:2 film model detector 1105.

In addition, when scene change is determined, the decision selector 1403, the 3:2 film model detector 1105, and the 2:2 film model detector 1104 have to be reset regardless of the scene change detection, and the fields are de-interlaced temporarily with BOB to avoid incorrect image. Generally speaking, when playing a film, the format determination signal G1401 denoting 3:2 film format will be always output if the film is in 3:2 film format. Accordingly, whether the rule has been broken, namely, whether the format determination signal G1401 is different is detected to determine whether there is scene change. The film scene change detector 1404 receives the format determination signal G1401 and the delayed determination signal G1402 and determines whether the two are the same. When the two signals are different, which means the rule has been broken, namely, film scene change occurs, the film scene change detector 1404 enables the film scene change signal FC1404 to reset the decision selector 1403, the 3:2 film model detector 1105, and the 2:2 film model detector 1104.

In summary, according to the present invention, combing detection is performed to received fields, and the combing detection result is compared with a plurality of built-in models to determine a de-interlace format for de-interlacing the video. Thus, precise film detection can be carried out so that the foregoing fields can be de-interlaced appropriately.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A video de-interlace apparatus, comprising:
a combing detection apparatus, for receiving a plurality of successive fields, performing combing detection to the fields and outputting a combing detection result wherein the successive fields comprise odd fields and even fields, the combing detection apparatus comprises:
a motion detection apparatus, for receiving the successive fields for determining whether there is motion between adjacent odd and even fields among the successive fields, wherein each of the fields comprises a plurality of pixels respectively denoted as P(x, y), and (x, y) represents a position of the pixel in the field, the motion detection apparatus comprises:
a motion calculation apparatus, for receiving pixel P(x, y) of the $i^{th}$ field, pixel P(x, y+1) of the $i^{th}$ field, pixel P(x, y) of the $(i+1)^{th}$ field, pixel P(x, y+1) of the $(i+1)^{th}$ field, pixel P(x, y) of the $(i+2)^{th}$ field, and pixel P(x, y+1) of the $(i+2)^{th}$ field, adding the difference between pixel P(x, y) of the $(i+2)^{th}$ field and pixel P(x, y) of the $(i+1)^{th}$ field to the difference between pixel P(x, y+1) of the $(i+2)^{th}$ field and pixel P(x, y) of the $(i+1)^{th}$ field as a first sum, adding the difference between pixel P(x, y+1) of the $(i+2)^{th}$ field and pixel P(x, y+1) of the $(i+1)^{th}$ field to the difference between pixel P(x, y+1) of the $(i+2)^{th}$ field and pixel P(x, y) of the $(i+1)^{th}$ field as a second sum, and adding the difference between pixel P(x, y) of the $(i+2)^{th}$ field and P(x, y) of the $i^{th}$ field to the difference between pixel P(x, y+1) of the $(i+2)^{th}$ field and P(x, y+1) of the $i^{th}$ field as a third sum, wherein i is a natural number and 0≦i≦the number of the fields;
a motion determination apparatus, for receiving the first, the second and the third sum, outputting an even pixel movement signal and an odd pixel movement signal, enabling the even pixel movement signal when the first sum and the third sum are greater than or equal to a first predetermined value, and enabling the odd pixel movement signal when the second sum and the third sum are greater than or equal to the first predetermined value; and a combing detector, for counting a combing number of a specific odd field and a specific even field when the motion detection apparatus determines there is motion between the specific odd field and the specific even field neighboring with the specific odd field among the successive fields; and a de-interlace format determining apparatus, for receiving the combing detection result and comparing the combing detection result with a plurality of models, when the combing detection result conforms to a specific model among the models, the de-interlace format determining apparatus determines a specific de-interlace format corresponding to the specific model to de-interlace the fields.

2. The video de-interlace apparatus as claimed in claim 1, wherein the motion calculation apparatus comprises:

a first subtractor, for performing subtraction to pixel P(x, y) of the $(i+2)^{th}$ field and pixel P(x, y) of the $(i+1)^{th}$ field, and outputting a first difference;

a second subtractor, for performing subtraction to pixel P(x, y+1) of the $(i+2)^{th}$ field and pixel P(x, y) of the $(i+1)^{th}$ field, and outputting a second difference;

a third subtractor, for performing subtraction to pixel P(x, y+1) of the $(i+2)^{th}$ field and pixel P(x, y+1) of the $(i+1)^{th}$ field, and outputting a third difference;

a fourth subtractor, for performing subtraction to pixel P(x, y) of the $(i+2)^{th}$ field and pixel P(x, y) of the $i^{th}$ field, and outputting a fourth difference;

a fifth subtractor, for performing subtraction to pixel P(x, y+1) of the $(i+2)^{th}$ field and pixel P(x, y+1) of the $i^{th}$ field, and outputting a fifth difference;

a first adder, coupled to the first subtractor and the second subtractor for receiving the first difference and the second difference, wherein the first adder adds the first difference to the second difference and outputs the first sum;

a second adder, coupled to the second subtractor and the third subtractor for receiving the second difference and the third difference, wherein the second adder adds the second difference to the third difference and outputs the second sum; and a third adder, coupled to the fourth subtractor and the fifth subtractor for receiving the fourth difference and the fifth difference, wherein the third adder adds the fourth difference to the fifth difference and outputs the third sum.

3. The video de-interlace apparatus as claimed in claim 2, wherein the third, the fourth, and the fifth adder further perform low-pass calculations.

4. The video de-interlace apparatus as claimed in claim 1, wherein the motion determination apparatus comprises:

a first comparator, for receiving the first sum and the first predetermined value, and outputting a first determination signal, wherein the first comparator enables the first determination signal when the first sum is greater than or equal to the first predetermined value;

a second comparator, for receiving the second sum and the first predetermined value, and outputting a second determination signal, wherein the second comparator enables the second determination signal when the second sum is greater than or equal to the first predetermined value;

a third comparator, for receiving the third sum and the first predetermined value, and outputting a third determination signal, wherein the third comparator enables the third determination signal when the third sum is greater than or equal to the first predetermined value;

a first logic circuit, coupled to the first and the third comparator, receiving the first and the third determination signal, and outputting the even pixel movement signal, wherein the first logic circuit enables the even pixel movement signal when both the first and the third determination signal are enabled; and a second logic circuit, coupled to the second and the third comparator, for receiving the second and the third determination signal, and outputting the odd pixel movement signal, wherein the second logic circuit enables the odd pixel movement signal when both the second and the third determination signal are enabled.

5. The video de-interlace apparatus as claimed in claim 1, wherein the combing detector comprises:

a combing determination apparatus, for receiving pixel P(x, y) of the $(i+1)^{th}$ field pixel P(x, y+1) of the $(i+1)^{th}$ field pixel P(x, y) of the $(i+2)^{th}$ field, and pixel P(x, y+1) of the $(i+2)^{th}$ field, wherein the combing determination apparatus outputs and enables a first comparison signal when the difference between pixel P(x, y) of the $(i+2)^{th}$ field and pixel P(x, y) of the $(i+1)^{th}$ field are greater than or equal to a second predetermined value, wherein the combing determination apparatus outputs and enables a second comparison signal when the difference between pixel P(x, y+1) of the $(i+2)^{th}$ field and pixel P(x, y) of the $(i+1)^{th}$ field are greater than or equal to the second predetermined value, wherein the combing determination apparatus outputs and enables a third comparison signal when the difference between pixel P(x, y+1) of the $(i+2)^{th}$ field and pixel P(x, y+1) of the $(i+1)^{th}$ field are greater than or equal to the second predetermined value, and wherein i is a natural number and $0 \leq i \leq$ the number of the fields;

a combing calculation apparatus, coupled to the combing determination apparatus and the motion determination apparatus, for receiving the first comparison signal, the second comparison signal, the third comparison signal, the odd pixel movement signal and the even pixel movement signal, and determining whether there is combing in pixel P(x, y) of the $(i+1)^{th}$ field, pixel P(x, y+1) of the $(i+1)^{th}$ field, pixel P(x, y) of the $(i+2)^{th}$ field, and pixel P(x, y+1) of the $(i+2)^{th}$ field according to the received signals, wherein the combing calculation apparatus adds a predetermined value to a combing accumulation as the combing accumulation when there is combing, wherein the combing calculation apparatus outputs the combing accumulation after all the pixels in the $(i+1)^{th}$ frame and the $(i+2)^{th}$ frame have been processed; and a combing accumulation record buffer, coupled to the combing calculation apparatus, for receiving the combing accumulation and storing the combing accumulation corresponding to every K successive fields, wherein K is nature number.

6. The video de-interlace apparatus as claimed in claim 5, wherein the combing determination apparatus comprises:

a sixth subtractor, for performing subtraction to pixel P(x, y) of the $(i+2)^{th}$ field and pixel P(x, y) of the $(i+1)^{th}$ field, and outputting a sixth difference;

a seventh subtractor, for performing subtraction to pixel P(x, y+1) of the $(i+2)^{th}$ field and pixel P(x, y) of the $(i+1)^{th}$ field, and outputting a seventh difference;

an eighth subtractor, for performing subtraction to pixel P(x, y+1) of the $(i+2)^{th}$ field and pixel P(x, y+1) of the $(i+1)^{th}$ field, and outputting an eighth difference;

a fourth comparator, for comparing the sixth difference and the second predetermined value, and outputting the first comparison signal, wherein the fourth comparator enables the first comparison signal when the sixth difference is greater than or equal to the second predetermined value;

a fifth comparator, for comparing the seventh difference and the second predetermined value, and outputting the second comparison signal, wherein the fifth comparator enables the second comparison signal when the seventh difference is greater than or equal to the second predetermined value; and a sixth comparator, for comparing the eighth difference and the second predetermined value, and outputting the third comparison signal, wherein the sixth comparator enables the third comparison signal when the eighth difference is greater than or equal to the second predetermined value.

7. The video de-interlace apparatus as claimed in claim 6, wherein the combing determination apparatus further comprises:

a combing checking apparatus, for receiving the sixth, the seventh, and the eighth difference, comparing the difference between pixel $P(x-1, y)$ of the $(i+2)^{th}$ field and pixel $P(x-1, y)$ of the $(i+1)^{th}$ field with the sixth difference, comparing the difference between pixel $P(x-1, y+1)$ of the $(i+2)^{th}$ field and pixel $P(x-1, y)$ of the $(i+1)^{th}$ field with the seventh difference, comparing the difference between pixel $P(x-1, y+1)$ of the $(i+2)^{th}$ field and pixel $P(x-1, y+1)$ of the $(i+1)^{th}$ field with the eighth difference, and outputting a first and a second combing determination signal, wherein the combing calculation apparatus is coupled to the combing checking apparatus for receiving the first comparison signal, the second comparison signal, the third comparison signal, the odd pixel movement signal, the even pixel movement signal, the first combing determination signal, and the second combing determination signal, and determining whether there is combing in pixel $P(x, y)$ of the $(i+1)^{th}$ field, pixel $P(x, y+1)$ of the $(i+1)^{th}$ field, pixel $P(x, y)$ of the $(i+2)^{th}$ field, and pixel $P(x, y+1)$ of the $(i+2)^{th}$ field according to the received signals.

8. The video de-interlace apparatus as claimed in claim 7, wherein the combing checking apparatus comprises:

a first combing type checker, for receiving the sixth and the seventh difference for determining the combing type of pixel $P(x, y)$, pixel $P(x, y+1)$ of the $(i+2)^{th}$ field and pixel $P(x, y)$ of the $(i+1)^{th}$ field;

a second combing type checker, for receiving the seventh and the eighth difference for determining the combing type of pixel $P(x, y)$, $P(x, y+1)$ of the $(i+1)^{th}$ field and pixel $P(x, y+1)$ of the $(i+2)^{th}$ field;

a first combing type register, storing the combing type of pixel $P(x-1, y)$, pixel $P(x-1, y+1)$ of the $(i+2)^{th}$ field and pixel $P(x-1, y)$ of the $(i+1)^{th}$ field;

a second combing type register, for storing the combing type of pixel $P(x-1, y)$, pixel $P(x-1, y+1)$ of the $(i+1)^{th}$ field and pixel $P(x-1, y+1)$ of the $(i+2)^{th}$ field;

a first combing type comparator, coupled to the first combing type checker and the first combing type register for comparing the combing type of pixel $P(x, y)$, pixel $P(x, y+1)$ of the $(i+2)^{th}$ field and pixel $P(x, y)$ of the $(i+1)^{th}$ field with the combing type of pixel $P(x-1, y)$, pixel $P(x-1, y+1)$ of the $(i+2)^{th}$ field and pixel $P(x-1, y)$ of the $(i+1)^{th}$ field, wherein the first combing type comparator outputs and enables the first combing determination signal when the two combing types is the same; and a second combing type comparator, coupled to the second combing type checker and the second combing type register for comparing the combing type of pixel $P(x, y)$, pixel $P(x, y+1)$ of the $(i+1)^{th}$ field and pixel $P(x, y+1)$ of the $(i+2)^{th}$ field with the combing type of pixel $P(x-1, y)$, pixel $P(x-1, y+1)$ of the $(i+1)^{th}$ field and pixel $P(x-1, y+1)$ of the $(i+2)^{th}$ field, wherein the second combing type comparator outputs and enables the second combing determination signal when the two combing types is the same.

9. The video de-interlace apparatus as claimed in claim 5, wherein the combing calculation apparatus comprises:

a first logic gate, for receiving the odd pixel movement signal, the first comparison signal and the second comparison signal, and outputting a first logic signal, wherein the first logic signal is in a first logic state when the odd pixel movement signal, the first comparison signal and the second comparison signal are enabled;

a second logic gate, for receiving the even pixel movement signal, the second comparison signal and the third comparison signal, and outputting a second logic signal, wherein the second logic signal is in the first logic state when the even pixel movement signal, the second comparison signal and the third comparison signal are enabled;

a delay circuit, coupled to the second logic gate, for receiving the second logic signal and outputting a second delayed logic signal after delaying the second logic signal for a predetermined time;

a third logic gate, coupled to the first logic gate and the delay circuit, for receiving the first logic signal and the second delayed logic signal, and outputting a third logic signal, wherein the third logic gate sets the third logic signal to the first logic state when both the first logic signal and the second delayed logic signal are in the first logic state;

a fourth logic gate, coupled to the first and the second logic gate, for receiving the first and the second logic signal, and outputting a fourth logic signal, wherein the fourth logic gate sets the fourth logic signal to the first logic state when both the first and the second logic signal are in the first logic state; and an accumulator, coupled to the third and the fourth logic gate, for receiving the third and the fourth logic signal, wherein the accumulator adds the predetermined value to the combing accumulation to serve as the combing accumulation when one of the third and the fourth logic signal is in the first logic state, and the accumulator adds two times of the predetermined value to the combing accumulation as the combing accumulation when both the third and the fourth logic signal are in the first logic state.

10. The video de-interlace apparatus as claimed in claim 5, wherein the combing calculation apparatus comprises:

a first logic gate, for receiving the odd pixel movement signal, the first comparison signal and the second comparison signal, and outputting a first logic signal, wherein the first logic signal is in a first logic state when the odd pixel movement signal, the first comparison signal and the second comparison signal are enabled;

a second logic gate, for receiving the even pixel movement signal, the second comparison signal and the third comparison signal, and outputting a second logic signal, wherein the second logic signal is in the first logic state when the even pixel movement signal, the second comparison signal and the third comparison signal are enabled;

a delay circuit, coupled to the second logic gate, for receiving the second logic signal and outputting a second delayed logic signal after delaying the second logic signal for a predetermined time;

a third logic gate, coupled to the first logic gate and the delay circuit, for receiving the first logic signal and the second delayed logic signal, and outputting a third logic signal, wherein the third logic gate sets the third logic signal to the first logic state when both the first logic signal and the second delayed logic signal are in the first logic state;

a fourth logic gate, coupled to the first and the second logic gate, for receiving the first and the second logic signal, and outputting a fourth logic signal, wherein the fourth logic gate sets the fourth logic signal to the first logic state when both the first and the second logic signal are in the first logic state; and a combing cluster recorder, coupled to the third and the fourth logic gate, receiving and recording the third and the fourth logic signal, and counting the number of the third logic signal and the fourth logic signal being in the first logic state within pixels $P(x, y){\sim}P(x{-}k, y{-}k)$, wherein the combing cluster recorder adds the number to the combing accumulation as the combing accumulation when the number is greater than a cluster predetermined value and outputs the combing accumulation after all the pixels in the $(i+1)^{th}$ frame and the $(i+2)^{th}$ frame have been processed, wherein k is a natural number and $k{\leq}x$, $k{\leq}y$.

11. The video de-interlace apparatus as claimed in claim 1, wherein the combing detection result comprises m combing accumulations, wherein the $i^{th}$ combing accumulation corresponds to the combing number in the $i^{th}$ field and the $(i+1)^{th}$ field, and wherein in and i are natural numbers and m>i, the de-interlace format determining apparatus comprises:

a film model detector, receiving m combing accumulations and comparing the m combing accumulations with a plurality of built-in film models, wherein when the m combing accumulations conforms to a specific model among the film models, the film model detector determines a specific de-interlace format corresponding to the specific model to de-interlace the fields.

12. The video de-interlace apparatus as claimed in claim 11, wherein the film model detector comprises:

a 2:2 film model detector, comprising:

a plurality of 2:2 film model comparators, each 2:2 film model comparator comprising one of a plurality of 2:2 film models, for receiving the m combing accumulations and respectively outputting "match", "mismatch", and "unsure" signals according to whether or not the m combing accumulations match the 2:2 film models of the 2:2 film model comparators;

a 2:2 film status detector, coupled to the 2:2 film model comparators, for outputting a specific 2:2 match signal and a specific 2:2 countermeasure signal corresponding to the 2:2 film model in a specific 2:2 film model comparator when the number of "match signals output by the specific 2:2 film model comparator are greater than a third predetermined value according to the "match", "mismatch", and "unsure" signal output by each of the 2:2 film model comparators; and a 3:2 film model detector, comprising:

a plurality of 3:2 film model comparators, each 3:2 film model comparator comprising one of a plurality of 3:2 film models, for receiving the m combing accumulations and respectively outputting "match", "mismatch", and "unsure" signals according to whether or not the m combing accumulations match the 3:2 film models of the 3:2 film model comparators;

a 3:2 film status detector, coupled to the 3:2 film model comparators, for outputting a specific 3:2 match signal and a specific 3:2 countermeasure signal corresponding to the 3:2 film model in a specific 3:2 film model comparator when a number of "match" signals output by the specific 3:2 film model comparator are greater than a third predetermined value according to the "match", "mismatch", and "unsure" signal output by each of the 3:2 film model comparators; and a de-interlace format decision maker, for receiving the specific 2:2 match signal, the specific 2:2 countermeasure signal, the specific 3:2 match signal and the specific 3:2 countermeasure signal, and determining a specific de-interlace format according to the received signals for de-interlacing the successive fields.

13. The video de-interlace apparatus as claimed in claim 12, wherein the de-interlace format decision maker comprises:

a format decision maker, coupled to the 2:2 film status detector and the 3:2 film status detector, for receiving the specific 2:2 match signal and the specific 3:2 match signal, and comparing the received signals with previously inputted the specific 2:2 match signal and the specific 3:2 match signal inputted to output a format decision signal; and a decision selector, coupled to the 2:2 film status detector and the 3:2 film status detector, for receiving the specific 2:2 countermeasure signal, the specific 3:2 countermeasure signal, and the format decision signal, and determining the specific de-interlace format among a plurality of de-interlace formats according to the received signals for de-interlacing the fields.

14. The video de-interlace apparatus as claimed in claim 13, wherein the de-interlace format decision maker further comprises:

a film scene change detector, coupled to the format decision maker, for receiving the format decision signal and determining whether there is scene change according to the previously received format decision signal and the format decision signal, wherein the film scene change detector outputs and enables a film scene change signal when there is scene change, wherein, when the film scene change signal is enabled, the film model detector and the decision selector are reset and receive another m combing accumulation to determine the de-interlace format for the successive fields.

15. The video de-interlace apparatus as claimed in claim 11, wherein the de-interlace format determining apparatus further comprises:

a scene change detector, receiving m combing accumulations, for determining whether there is scene change according to the m combing accumulations, wherein the scene change detector outputs and enables a scene change signal when there is scene change, and wherein the film format detector is reset and receives another m combing accumulation to determine the de-interlace format for the successive fields when the scene change signal is enabled.

16. A video de-interlace method, comprising:

providing a plurality of successive fields;

performing combing detection to the fields to obtain a combing detection result wherein the successive fields comprise odd fields and even fields, and the steps of the combing detection comprises:
(a) determining whether there is motion between adjacent odd and even fields among the successive fields, wherein, each of the fields comprises a plurality of pixels respectively denoted as P(x, y), wherein (x, y) represents the position of the pixel in the field, and step (a) comprises:
receiving pixel P(x, y) of the $i^{th}$ field, pixel P(x, y+1) of the $i^{th}$ field, pixel P(x, y) of the $(i+1)^{th}$ field, pixel P(x, y+1) of the $(i+1)^{th}$ field, pixel P(x, y) of the $(i+2)^{th}$ field, and pixel P(x, y+1) of the $(i+2)$ field;
adding a difference between pixel P(x, y) of the $(i+2)^{th}$ field and pixel P(x, y) of the $(i+1)^{th}$ field to a difference between pixel P(x, y+1) of the $(i+2)^{th}$ field and pixel P(x, y) of the $(i+1)^{th}$ field as a first sum;
adding a difference between pixel P(x, y+1) of the $(i+2)^{th}$ field and pixel P(x, y+1) of the $(i+1)^{th}$ field to a difference between pixel P(x, y+1) of the $(i+2)^{th}$ field and pixel P(x, y) of the $(i+1)^{th}$ field as a second sum;
adding a difference between pixel P(x, y) of the $(i+2)^{th}$ field and pixel P(x, y) of the $i^{th}$ field to a difference between pixel P(x, y+1) of the $(i+2)^{th}$ field and pixel P(x, y+1) of the $i^{th}$ field as a third sum, wherein i is a natural number and 0<=i<=the number of the fields; and
determining an even pixel movement, when the second and the third sum being greater than or equal to the first predetermined value, determining an odd pixel movement when the first and the third sum are greater than or equal to a first predetermined value;
(b) counting a combing number of a specific odd field and a specific even field when the motion detection apparatus determines there is motion between the specific odd field and the specific even field neighboring with the specific odd field among the successive fields; and
repeating the foregoing operation m times to obtain m combing numbers, wherein m is a natural number;
comparing the combing detection result with a plurality of models; and
determining a specific de-interlace format corresponding to a specific model for de-interlacing the fields when the combing detection result conforms to the specific model among the models.

17. The video de-interlace method as claimed in claim 16, wherein step b comprises:
adding a predetermined value to a combing accumulation as the combing accumulation when the difference between pixel P(x, y) of the $(i+2)^{th}$ field and pixel P(x, y) of the $(i+1)^{th}$ field being greater than or equal to a second predetermined value and the difference between pixel P(x, y+1) of the $(i+2)^{th}$ field and pixel P(x, y) of the $(i+1)^{th}$ field are greater than or equal to the second predetermined value and odd pixel movement;
adding the predetermined value to the combing accumulation as the combing accumulation when the difference between pixel P(x, y+1) of the $(i+2)^{th}$ field and pixel P(x, y) of the $(i+1)^{th}$ field being greater than or equal to the second predetermined value and the difference between pixel P(x, y+1) of the $(i+2)^{th}$ field and pixel P(x, y+1) of the $(i+1)^{th}$ field being greater than or equal to the second predetermined value and even pixel movement; and
serving the combing accumulation as the combing number after all the pixels in the $(i+1)^{th}$ frame and the $(i+2)^{th}$ frame have been processed.

18. The video de-interlace method as claimed in claim 17, wherein when the difference between pixel P(x, y) of the $(i+2)^{th}$ field and pixel P(x, y) of the (i+1) field are greater than or equal to a second predetermined value and the difference between pixel P(x, y+1) of the $(i+2)^{th}$ field and pixel P(x, y) of the $(i+1)^{th}$ field are greater than or equal to the second predetermined value, odd pixel movement includes:
adding the predetermined value to the combing accumulation as the combing accumulation when the combing type of pixel P(x, y), pixel P(x, y+1) of the $(i+2)^{th}$ field and pixel P(x, y) of the $(i+1)^{th}$ field is the same as the combing type of pixel P(x-1, y), pixel P(x-1, y+1) of the $(i+2)^{th}$ field and pixel P(x-1, y) of the $(i+1)^{th}$ field.

19. The video de-interlace method as claimed in claim 17, wherein when the difference between pixel P(x, y+1) of the $(i+2)^{th}$ field and pixel P(x, y) of the $(i+1)^{th}$ field are greater than or equal to the second predetermined value and the difference between pixel P(x, y+1) of the $(i+2)^{th}$ field and pixel P(x, y+1) of the $(i+1)^{th}$ field are greater than or equal to the second predetermined value, even pixel movement includes:
adding the predetermined value to the combing accumulation as the combing accumulation when the combing type of pixel P(x, y), pixel P(x, y+1) of the $(i+1)^{th}$ field and pixel P(x, y+1) of the $(i+1)^{th}$ field is the same as the combing type of pixel P(x-1, y), pixel P(x-1, y+1) of the $(i+2)^{th}$ field and pixel P(x-1, y+1) of the $(i+1)^{th}$ field.

20. The video de-interlace method as claimed in claim 16, wherein the step of respectively comparing the combing detection result with a plurality of models comprises:
comparing m combing numbers with a plurality of 2:2 film models; and
comparing m combing numbers with a plurality of 3:2 film models.

21. The video de-interlace method as claimed in claim 16, wherein the specific de-interlace format comprises BOB, forward weave, and backward weave.

* * * * *